(12) United States Patent
Wakahara et al.

(10) Patent No.: US 6,957,570 B2
(45) Date of Patent: Oct. 25, 2005

(54) THERMOSTAT MALFUNCTION DETECTING SYSTEM FOR ENGINE COOLING SYSTEM

(75) Inventors: Keiji Wakahara, Kariya (JP); Akira Ichikawa, Chiryu (JP)

(73) Assignee: Denso Corporation (JP)

( * ) Notice: Subject to any disclaimer, the term of this patent is extended or adjusted under 35 U.S.C. 154(b) by 4 days.

(21) Appl. No.: 10/790,779

(22) Filed: Mar. 3, 2004

(65) Prior Publication Data

US 2004/0168510 A1 Sep. 2, 2004

Related U.S. Application Data

(62) Division of application No. 10/359,266, filed on Feb. 6, 2003, now Pat. No. 6,725,710, which is a division of application No. 10/100,039, filed on Mar. 19, 2002, now Pat. No. 6,679,110, which is a division of application No. 09/693,904, filed on Oct. 23, 2000, now Pat. No. 6,386,022, which is a division of application No. 08/988,907, filed on Dec. 11, 1997, now Pat. No. 6,279,390.

(30) Foreign Application Priority Data

Dec. 17, 1996 (JP) .............................................. 8-336579
Dec. 25, 1996 (JP) .............................................. 8-344749
Oct. 16, 1997 (JP) .............................................. 9-283208

(51) Int. Cl.[7] .......................................... G01M 15/00
(52) U.S. Cl. .................................... 73/118.1; 73/119 R
(58) Field of Search ............................. 73/116, 117.2, 73/117.3, 118.1, 119 R

(56) References Cited

U.S. PATENT DOCUMENTS

| 4,062,231 A | 12/1977 | Mercik, Jr. et al. |
| 4,069,712 A | 1/1978 | Armstrong et al. |
| 4,235,100 A | 11/1980 | Branchini |
| 4,381,744 A | 5/1983 | Terry |
| 4,556,029 A | 12/1985 | Yamaguchi et al. |
| 4,682,493 A | 7/1987 | Tenenbaum |
| 4,702,620 A | 10/1987 | Ford |
| 4,748,941 A | 6/1988 | Kashiwase |
| 4,770,146 A | 9/1988 | Shibata et al. |
| 5,153,835 A | 10/1992 | Hashimoto et al. |
| 5,263,462 A | 11/1993 | Reddy |
| 5,269,277 A | 12/1993 | Kuroda et al. |
| 5,337,704 A | 8/1994 | Roth |
| 5,373,823 A | 12/1994 | Kuroda et al. |
| 5,381,952 A | 1/1995 | Duprez |
| 5,381,953 A | 1/1995 | Fishman |

(Continued)

FOREIGN PATENT DOCUMENTS

| JP | U-55-135983 | 3/1980 |
| JP | 58-008225 | 1/1983 |

(Continued)

OTHER PUBLICATIONS

Digital OBDII Code Reader Owner's Manual, pp. 1–47 (note e.g. pp. 15–16, 20–21 and 47 re DTC's), undated.
TSB 93–24–8, Thermostat Diagnosis, Ford Motor Company, 1993, 1 page.

(Continued)

*Primary Examiner*—Eric S. McCall
(74) *Attorney, Agent, or Firm*—Nixon & Vanderhye PC

(57) ABSTRACT

A malfunction of a thermostat in a coolant circulating path is detected from an engine side coolant temperature in consideration of the following behavior of the coolant temperature. When an open-malfunction occurs, the coolant temperature becomes different considerably from that in the normal time in the temperature range in which the thermostat is to be normally closed. When a closure-malfunction occurs, the coolant temperature becomes different considerably from that during the normal time in the temperature range in which the thermostat is to be normally opened. Alternatively, the malfunction may be detected from a difference between the engine side coolant temperature and a radiator side coolant temperature.

3 Claims, 29 Drawing Sheets

U.S. PATENT DOCUMENTS

| | | | |
|---|---|---|---|
| 5,465,617 A | 11/1995 | Dudek et al. | |
| 5,477,827 A | 12/1995 | Weisman, II et al. | |
| 5,582,138 A | 12/1996 | Ziolek et al. | |
| 5,656,765 A | 8/1997 | Gray | |
| 5,690,276 A | 11/1997 | Thiel et al. | |
| 5,884,243 A | 3/1999 | Taniguchi et al. | |
| 5,967,101 A | 10/1999 | Roth et al. | |
| 6,128,948 A | 10/2000 | Shi et al. | |
| 6,161,767 A | 12/2000 | Yeo | |
| 6,200,021 B1 | 3/2001 | Mitsutani et al. | |
| 6,230,553 B1 | 5/2001 | Uchiyama et al. | |
| 6,240,774 B1 | 6/2001 | Niki et al. | |
| 6,279,390 B1 | 8/2001 | Oka et al. | |
| 6,283,381 B1 | 9/2001 | Uchiyama | |
| 6,302,065 B1 * | 10/2001 | Davison | 123/41.15 |
| 6,321,695 B1 | 11/2001 | Yoo et al. | |
| 6,321,696 B1 | 11/2001 | Nishioka et al. | |
| 6,386,022 B1 | 5/2002 | Oka et al. | |
| 6,389,889 B1 | 5/2002 | Ford | |
| 6,463,892 B1 | 10/2002 | Russell | |
| 6,532,807 B1 | 3/2003 | Krauss | |
| 6,665,608 B2 | 12/2003 | Wakahara et al. | |
| 6,679,110 B2 | 1/2004 | Oka et al. | |
| 6,725,710 B2 | 4/2004 | Oka et al. | |
| 6,752,011 B2 | 6/2004 | Matsumoto et al. | |
| 2002/0088274 A1 | 7/2002 | Oka et al. | |
| 2002/0111734 A1 | 8/2002 | Wakahara et al. | |
| 2002/0152972 A1 | 10/2002 | Iwasaki et al. | |

FOREIGN PATENT DOCUMENTS

| | | |
|---|---|---|
| JP | 61-099650 | 6/1986 |
| JP | 63-88248 | 4/1988 |
| JP | 64-003220 | 1/1989 |
| JP | 02-050043 | 4/1990 |
| JP | 02-072343 | 6/1990 |
| JP | A-4-19329 | 1/1992 |
| JP | 04-060150 | 2/1992 |
| JP | 04-132818 | 5/1992 |
| JP | 05-195895 | 8/1993 |
| JP | 06-281538 | 10/1994 |
| JP | 6-288281 | 10/1994 |
| JP | 6-294326 | 10/1994 |
| JP | A-6-213117 | 11/1994 |
| JP | 7-12217 | 7/1995 |
| JP | 08-177487 | 7/1996 |
| JP | 08-284663 | 10/1996 |
| JP | 08-326590 | 12/1996 |
| JP | 10-220639 | 8/1998 |
| WO | WO 90/01631 | 2/1990 |

OTHER PUBLICATIONS

DTC P0125 Engine Coolant Temperature (ECT) Insufficient for Closed Loop Fuel Control, General Motors Corporation, 1996, 4 pages.

L Platform Service Manual, Chevrolet Geo, GMP/96–L–2 Book 2 of 2, 1996, cover page and pp. 6E–432–6E–434 (DTC P0125).

2001 Chevrolet Malibu L/N Service Manual, p. 6–353 (DTC P0125) and p. 6–355 (DTC P0128).

EPA Mail–Out # 96–22; "On–Board Diagnostics II (OBD II) Regulatory Review"; pp. 1–13; Jul. 1996.

1997 Chevrolet Malibu, Oldsmobile Cutlass Service Manual; GMP/97–LN–2; Book 2; L/N Platform; Aug. 1996; pp. 6E–94, 6E–95.

1998 Malibu and Cutlass Service Manual; GMP/09LN–3; L/N Platform; vol. 3; Jun. 1997; pp. 6–562, 6–563, 6–994–995.

1996 Cadillac DeVille/Concours/Eldorado/Seville Service Information; Book 2 Powertrain; E/K Platform; 1996; 6E–96–97.

1996 Cadillac De Ville/Concours/Eldorado/Seville New Product Service Information; 1995; 6E–A–121–122.

1998 De Ville and Eldorado Service Manual; vol. 3; Jul. 1997; 6–378–379.

1997 DeVille/Eldorado/Seville Service Manual; GMP/97–EK–2; Book 2; Mar. 1997; 6–338–339.

1996 Cadillac Fleetwood (Rear Wheel Drive) Service Information; Book 2 Powertrain; D Platform; Apr. 1996; 6E–A–87–89.

1996 Cadillac Fleetwood New Product Service Information; 1995; 6E3–A–86–88.

1996 Chevrolet Lumina, Monte Carlo, Pontiac Grand Prix, Oldsmobile Cutlass Supreme and Buick Regal Service Manual; GMP/96–W–2P; Book 2 (Preliminary); W Platform; Jun. 1995; 6E3–A–84 –85.

1996 Chevrolet Lumina, Monte Carlo, Pontiac Grand Prix, Oldsmobile Cutlass Supreme and Buick Regal Service Manual; GMP/96–W–2; Book 2; W Platform; Apr. 1996; 6E–A–872–874.

1997 Pontiac Grand Prix Service Manual; Book 2; W Platform; Sep. 1996; 6E–95–96; 6E–521–522.

1997 Buick Century and Regal Service Manual; Book 3; W Platform; Jan. 1997; 6E–100–101; 6E–570–571.

1998 Pontiac Grand Prix Service Manual; GMP/98–WP–3; vol. 3; W Platform; May 1997; 6–696–697; 6–1276–1277.

1996 Chevrolet Corsica/Beretta Service Manual; GMP/96–L–2P; Book 2 (Preliminary); L Platform; Jun. 1995; 6E3–A–76–77; 6E3–A–85.

1996 Chevrolet Corsica/Beretta Service Manual; GMP/96–L–2; Book 2; L Platform; Feb. 1996; 6E–432–433.

1996 Chevrolet Lumina, Pontiac Trans Sport, Oldsmobile Silhouette Service Manual; GMP/96–U–2P; Book 2 (Preliminary); U–Van Platform; Sep. 1995; 6E3–A–93–94.

1996 Chevrolet Lumina, Pontiac Trans Sport, Oldsmobile Silhouette Service Manual; GMP/96–U–2; Book 2; U–Van Platform; Mar. 1996; 6E–96–97.

1997 Chevrolet Venture, Pontiac Trans Sport, and Oldsmobile Silhouette Service Manual; GMP/97–U–2; Book 2; U–Platform; Oct. 1996; 6E–99–100.

1998 Chevrolet Venture, Pontiac Trans Sport and Oldsmobile Silhouette Service Manual; GMP/98–U–3; vol. 3; U–Platform; Jun. 1997; 6–456–457.

1997 Pontiac Grand Am, Oldsmobile Achieva and Buick Skylark Service Manual; GMP/97–N–2; Book 2; N–Platform; May 1996; 6E–93–94; 6E–486–487.

1998 Grand Am, Achieva and Skylark Service Manual; GMP/98–N–3; vol. 3; N Platform; May 1997; 6–565–566; 6–974.

1996 Park Avenue, LeSabre, Ninety–Eight, Eighty–Eight and Bonneville Service Manual; GMP/96–CH–2P; Book 2 (Preliminary); C/H Platform; Jun. 1995; 6E3–A–112–113.

1996 Park Avenue, LeSabre, Ninety–Eight, Eighty–Eight and Bonneville Service Manual; GMP/96–CH–2; Book 2; C/H Platform; Mar. 1996; 6E–114–115.

1997 LeSabre, Eighty–Eight and Bonneville Service Manual; GMP/97–H–2; Book 2; H Platform; May 1996; 6E–118–119.

Document ID#65878; 1997 GMC Truck Yukon–4WD; DTC P0125 Engine Coolant Temperature (ECT) Insufficient for Closed Loop Fuel Control; 4 pages.

Document ID#13253; 1996 GMC Sonoma; DTC P0125 Engine Coolant Temperature (ECT) Insufficient For Closed Loop Fuel Control; 4 Pages.

1998 LeSabre, Eighty–Eight and Bonneville Service Manual; GMP/98–H–3; vol. 3; H Platform; May 1997; 6–409–410.

1996 Chevrolet Cavalier and Pontiac Sunfire Service Manual; GMP/96–J–2P; Book 2 (Preliminary); J Platform; May 1995; 6E3–A–78–79; 6E3–A–85–87.

1996 Chevrolet Cavalier and Pontiac Sunfire Service Manual; GMP/96–J–2; Book 2; J Platform; Feb. 1996; 6E–92–93; 6E–476–477.

1997 Chevrolet Cavalier and Pontiac Sunfire Service Manual; GMP/97–J–2; Book 2; J Platform; May 1996; 6E–95–96; 6E–502–503.

1995 Chevrolet Camaro and Pontiac Firebird Service Manual Supplement; GMP/95–F–UPD; F Platform; Dec. 1994; 6E3–A–97; 6E3–A–100.

1996 Chevrolet Camaro and Pontiac Firebird Service Manual; GMP/96–F–2P; Book 2 (Preliminary); F Platform; Jun. 1995; 6E3–A–96–97; 6E3–A–90–91.

1996 Chevrolet Camaro and Pontiac Firebird Service Manual; GMP/96–F–2; Book 2; F Platform; Mar. 1996; 6E–103; 6E–547–548.

1997 Chevrolet Camaro and Pontiac Firebird Service Manual; GMP/97–F–2; Book 2; F Platform; May 1996; 6E–102–103; 6E–566–567.

1998 Chevrolet Camaro and Pontiac Firebird Service Manual; GMP/98–F–3; vol. 3; F Platform; Jun. 1997; 6–706–707; 6–1280–1281.

1996 Chevrolet Corvette Service Manual; Book 2; Y Platform; Jan. 1996; 6–366–367.

1997 Corvette Service Manual; GMP/97–Y–3; Book 3; Y Platform; Mar. 1997; 6–483–484.

1998 Corvette Preliminary Service Manual; vol. 3; Y Platform; Apr. 1997; 6–480–481.

2000 Service Manual –Pontiac; GMP/00–HP–1; H Platform; vol. 1; 6–418; 6–213.

2000 Service Manual –Buick Le Sabre; 6–357; 6–174.

2000 Service Manual –Chevrolet Cavalier and Pontiac Sunfire; GMP/00–J–1; J–Platform; vol.1; 6–571; 6–379–380.

2000 Service Manual –Pontiac Grand Am and Oldsmobile Alero; M–Platform; 6–594; 6–426–427.

2001 Service Manual –Chevrolet Cavalier and Pontiac Sunfire; GMP/01–J–1; J–Platform; vol. 1; 6–575; 6–415.

2001 Service Manual –Chevrolet Venture, Pontiac Montana and Oldsmobile Silhouette; GMP/01–U–1; U–Platform; vol. 1; 6–420; 6–250.

2001 Service Manual –Chevrolet Silverado, Suburban, Tahoe and GMC Sierra, Yukon, Yukon XL, Denali, Denali XL; CK8 Truck; GMP/01–CK8–2; vol. 2; 6–2863; 6–1437.

2001 Service Manual –Chevrolet Impala, Monte Carlo; GMP/01–WCI–2;W–Platform; vol. 2; 6–1127; 6–517.

2001 Service Manual –Chevrolet Malibu; L/N–Platform; 6–355; 6–219.

2002 Service Manual –Buick Le Sabre; 6–429; 6–263.

2003 Service Manual –Cadillac CTS; GMP/03–D–1; vol. 1; 6–579; 6–336.

2003 Service Manual –Cadillac Seville; GMP/03–K–1; 6–719; 6–508.

2003 Service Manual –Chevrolet Impala, Monte Carlo; GMP/03–WCI–2; vol. 2; 6–1113; 6–467.

2003 Service Manual –Chevrolet Tahoe, Suburban, Avalanche, GMC Yukon/Yukon XL, Yukon Denali/Yukon XL Denali, Cadillac Escalade/Escalade ESV, Escalade EXT; GMT03–CKUV–2; vol. 2; 6–1412; 6–619.

2004 Service Manual –Chevrolet Tahoe, Suburban, Avalanche, GMC Yukon/Yukon XL, Yukon Denali/Yukon XL Denali, Cadillac Escalade/Escalade ESV, Escalade EXT; CK8 Truck; 6–897; 6–1464; 6–621.

2004 Service Manual –Buick Rainier, Chevrolet TrailBlazer, GMC Envoy; GMT/04–STNS–2; ST Truck; vol. 2; 6–826; 6–1243; 6–622.

Wakahara et al; U.S. Appl. No. 10/986,228 filed Nov. 12, 2004; "Thermostat Malfunction Detecting System for Engine Cooling System"; Claims 37–78 (only).

Wakahara et al; U.S. Appl. No. 10/984,931 filed Nov. 10, 2004; "Thermostat Malfunction Detecting System for Engine Cooling System"; Claims 37–49 (only).

Wakahara et al; U.S. Appl. No. 10/984,980 filed Nov. 10, 2004; "Thermostat Malfunction Detecting System for Engine Cooling System"; Claims 37–119 (only).

* cited by examiner

| THA (°C) | -20 | 0 | 20 | 40 | 60 | 80 |
|---|---|---|---|---|---|---|
| KQTHA | 0.5 | 0.7 | 0.8 | 0.9 | 0.95 | 1 |

| SPD (km/h) | 0 | 30 | 60 | 90 | 120 | 150 |
|---|---|---|---|---|---|---|
| KQSPD | 1 | 0.95 | 0.9 | 0.85 | 0.8 | 0.75 |

| ELB | ON | OFF |
|---|---|---|
| KQELB | 0.8 | 1 |

THERMOSTAT MALFUNCTION DETECTING SYSTEM FOR ENGINE COOLING SYSTEM

CROSS-REFERENCE TO RELATED APPLICATIONS

This application is a division of application Ser. No. 10/359,266, filed Feb. 6, 2003; now U.S. Pat. No. 6,725,710 which was a division of application Ser. No. 10/100,039, filed Mar. 19, 2002, now U.S. Pat. No. 6,679,110; which was a division of application Ser. No. 09/693,904, filed Oct. 23, 2000, now U.S. Pat. No. 6,386,022; which was a division of application Ser. No. 08/988,907 filed Dec. 11, 1997, now U.S. Pat. No. 6,279,390; the entire content of each of which is hereby incorporated by reference in this application.

This application relates to and incorporate herein by reference Japanese Patent Applications No. 8-336579 filed on Dec. 17, 1996, No. 8-344749 filed on Dec. 25, 1996 and No. 9-283208 filed on Oct. 16, 1997.

BACKGROUND OF THE INVENTION

1. Field of the Invention

The present invention relates to a thermostat malfunction detecting system of an engine cooling system for detecting whether a thermostat for controlling the temperature of coolant of an engine is in malfunction or not.

2. Related Art

Generally, a thermostat which opens/closes in correspondence to the temperature of a coolant (cooling water) is provided in a coolant circulating path for circulating the coolant between a water jacket within an engine and a radiator in the water-cooled type engine. It is closed from the start of the engine until when the warm-up operation is completed to halt the circulation of the coolant to raise the temperature of the coolant quickly to the required temperature range and to improve the fuel consumption and to reduce noxious exhaust emission. The thermostat automatically opens when the temperature of the coolant on the engine side exceeds the required temperature range to circulate the low temperature coolant on the radiator side to the engine side to lower or maintain the temperature of the coolant on the engine side to the required temperature range.

As modes of malfunction of the thermostat, there are an open-malfunction during which the thermostat is kept opened and a closure-malfunction during which it is kept closed. When the open-malfunction occurs, the cold coolant within the radiator is circulated to the engine from the beginning of start even during the cold start time during which the engine is started while it is cold, so that the temperature of the coolant on the engine side is hampered from rising after the start, thus retarding the warm-up of the engine and increasing the fuel consumption and noxious exhaust emission. When the closure-malfunction occurs, the cold coolant on the radiator side is not circulated even when the temperature of the coolant on the engine side exceeds the required temperature range, so that there is a possibility that the temperature of the coolant on the engine side keeps rising, causing an over-heat of the engine in the end.

Thus, there has been a possibility that even when the thermostat has the open-malfunction, a driver continues to drive a vehicle without knowing it for a long period of time and continues to drive the vehicle until engine overheats when it has the closure-malfunction.

It is noted that there has been a technology of providing coolant temperature sensors at the inlet and outlet of the radiator, respectively, to evaluate the heat radiating performance of the radiator based on the temperature of coolant at the inlet and outlet of the radiator to detect the deterioration of the radiator as disclosed in Japanese Patent Application Laid-Open No. Hei. 4-19329. However, because the thermostat opens/closes automatically in correspondence to the temperature of the coolant on the engine side, the malfunction of the thermostat cannot be detected even if the coolant temperature on the radiator side which is not related to the opening/closing operation of the thermostat is detected at the two spots as disclosed. Still more, the cost becomes high because two temperature sensors have to be provided anew on the radiator side.

SUMMARY OF THE INVENTION

Accordingly, it is an object of the present invention to provide a thermostat malfunction detecting system of a cooling system of an internal combustion engine which detects the malfunction of the thermostat accurately at relatively low cost.

According to a first aspect of the present invention, a thermostat malfunction detecting system of detects, based on the behavior of a coolant temperature on the engine side, the coolant temperature on the path for circulating the coolant on the engine side from the thermostat (engine side coolant temperature) and diagnoses the thermostat whether it has an open-malfunction by which it is not closed and is kept opened (open-malfunction) based on the engine side coolant temperature detected in a temperature range in which the thermostat is normally closed. Because the behavior of the engine side coolant temperature is largely different during the normal time and during the open-malfunction in the temperature range in which the thermostat is normally closed, the thermostat may be diagnosed whether it has the open-malfunction accurately from the behavior of the engine side coolant temperature in this temperature range. Still more, because the coolant temperature may be detected by using the coolant temperature sensor for controlling the engine provided in the conventional engine, no new coolant temperature sensor needs to be added to the engine control system.

When a closure-malfunction by which the thermostat is not opened and is kept closed occurs, the thermostat is not opened, the coolant is not circulated and the engine side coolant temperature continues to rise up. Accordingly, the thermostat malfunction detecting system diagnoses the thermostat whether it has the closure-malfunction based on the detected engine side coolant temperature in the temperature range in which the thermostat is normally opened. Because the behavior of the engine side coolant temperature is largely different during the normal time and during the closure-malfunction in the temperature range in which the thermostat is normally opened, the thermostat may be diagnosed accurately whether it has the closure-malfunction from the behavior of the engine side coolant temperature in this temperature range.

According to a second aspect of the present invention, a thermostat malfunction detecting system detects the coolant temperature on the path for circulating the coolant on the engine side from the thermostat (engine side coolant temperature) as well as a coolant temperature on the path for circulating the coolant on the radiator side from the thermostat (radiator side coolant temperature) and diagnoses the thermostat whether it has a malfunction based on the engine side coolant temperature and the radiator side coolant temperature. Thereby, the malfunction of the thermostat can be detected accurately. Still more, because the engine side coolant temperature may be detected by using the coolant temperature sensor for controlling the engine which has been provided in the conventional engine and just a radiator side coolant temperature detecting means needs to be added anew to the engine control system, the structure can be relatively simple and the increase of the cost is minimized.

According to a third aspect of the present invention, a thermostat malfunction detecting system determines that the thermostat has a malfunction when a coolant temperature drops below a malfunction discriminating temperature which is lower than the thermostat closing temperature after when the coolant temperature reaches a warm-up completion temperature. That is, when the drop of the coolant temperature does not stop even if the coolant temperature drops below the thermostat closing temperature, it may be considered that the open-malfunction has occurred. Thereby, the open-malfunction of the thermostat may be detected by using the conventional coolant temperature sensor provided on the coolant circulating path of the engine and no new sensor or the like needs to be added, satisfying the demand on the reduction of the cost.

BRIEF DESCRIPTION OF DRAWINGS

Other objects, features and advantages of the present invention will become more apparent in the following description and the accompanying drawings in which like numerals refer to like parts. In the accompanying drawings.

DETAILED DESCRIPTION OF PREFERRED EMBODIMENTS (First Embodiment)

Figure 1:
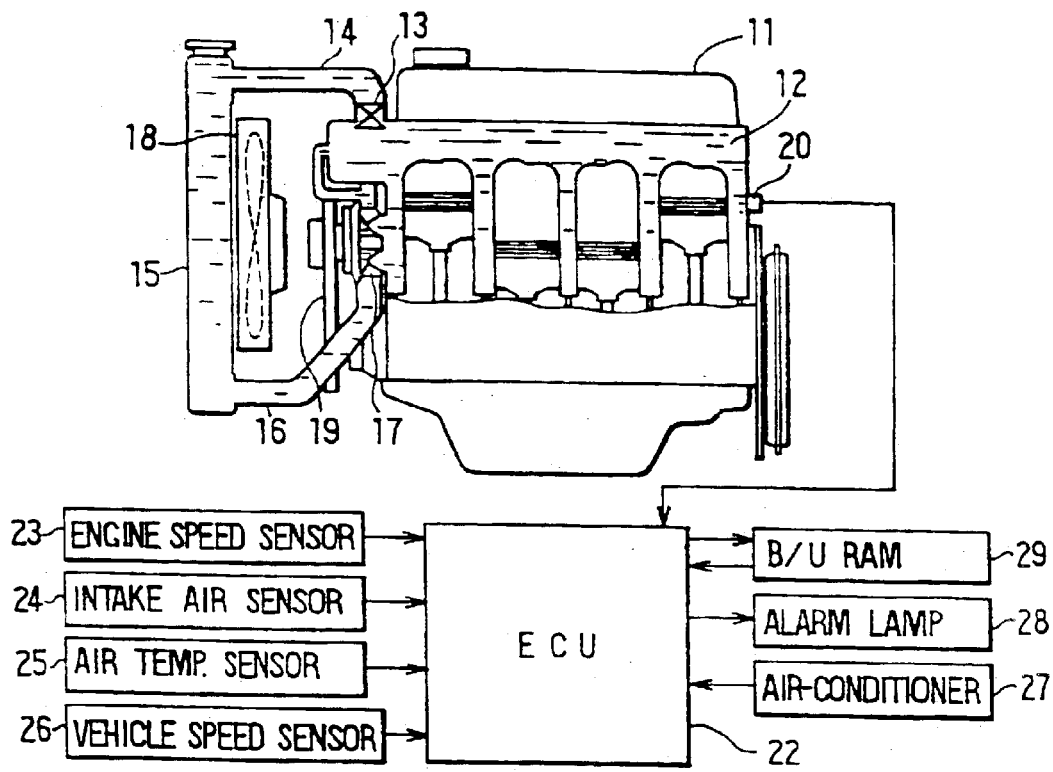
FIG. 1 is a block diagram showing the structure of the whole engine cooling system according to a first embodiment of the present invention.

In a cooling system of an engine shown in FIG. 1, a water jacket 12 is provided within a cylinder block and a cylinder head of an engine 11 and a coolant (cooling water) is supplied within the water jacket 12. A thermostat 13 is provided at the outlet part of the water jacket 12 so that the high temperature coolant which passes through the thermostat 13 is sent to a radiator 15 via a coolant circulating path 14. The coolant whose heat has been radiated by the radiator 15 and whose temperature has dropped is returned to the water jacket 12 via a coolant circulating path 16. Accordingly, when a valve within the thermostat 13 is opened, the coolant circulates through the path of the water jacket 12, the thermostat 13, the coolant circulating path 14, the radiator 15, the coolant circulating path 16 and the water jacket 12 to cool and maintain the engine 11 to a required temperature.

A water pump 17 is provided at the inlet of the water jacket 12. It is rotationally driven by the power of the engine transmitted via a belt 19 to forcibly circulate the coolant within the coolant circulating paths. A radiator fan 18, i.e. an electrically driven fan, is provided behind the radiator 15 to enhance the heat radiating effect of the radiator 15 and to promote the cooling of the coolant within the radiator 15.

A coolant temperature sensor 20 for detecting the temperature of the coolant within the water jacket 12 (coolant temperature on the engine side) which is the coolant circulating path on the side of the engine 11 rather than the thermostat 13 is provided in the cylinder block of the engine 11. It is noted that the coolant temperature sensor 20 may be set at any position as long as it is on the coolant circulating path on the side of the engine 11 rather than the thermostat 13. That is, it may be set at the cylinder head side of the water jacket 12 for example.

An output signal of the coolant temperature sensor 20 is applied to an electronic control unit (ECU) 22. The ECU 22 mainly comprised of a microcomputer controls the engine 11 and diagnoses the malfunction of the thermostat 13. It is to be noted that the ECU 22 may be comprised of two ECUs separated as an engine control ECU and a thermostat malfunction diagnosis ECU or may be arranged so as to control the engine and to diagnose the malfunction of the thermostat 13 by one ECU.

In addition to the coolant temperature signal from the coolant temperature sensor 20, the ECU 22 receives an engine speed signal from an engine speed sensor 23, an intake air amount signal from an intake air sensor 24, an intake air temperature signal from an intake air temperature sensor 25, a vehicle speed signal from a vehicle speed sensor 26 and a signal indicating an operating state of a blower motor (not shown) of an air conditioner 27 as information for controlling the engine 11 and to diagnose the malfunction of the thermostat 13. The ECU 22 is connected to an alarm lamp 28 for alarming a malfunction of the thermostat 13 and to a backup RAM 29 which is a rewritable non-volatile memory for storing information of the malfunction of the thermostat 13 and the like. The backup RAM 29 is arranged such that electric power is supplied from a battery not shown even when the engine is stopped to keep the memory of the information on malfunction to allow the information on malfunction to be read out during repair and inspection.

Each program for diagnosing the malfunction of the thermostat is stored in a ROM (memory) built in the ECU 22. The thermostat 13 is diagnosed whether it has the open-malfunction or the closure-malfunction by performing those programs.

At this time, the thermostat 13 is diagnosed whether it has the open-malfunction during which the thermostat 13 is kept opened by either one of the following five diagnosing methods (1) through (5).

(1) First Diagnosis of Open-Malfunction

Figure 2:
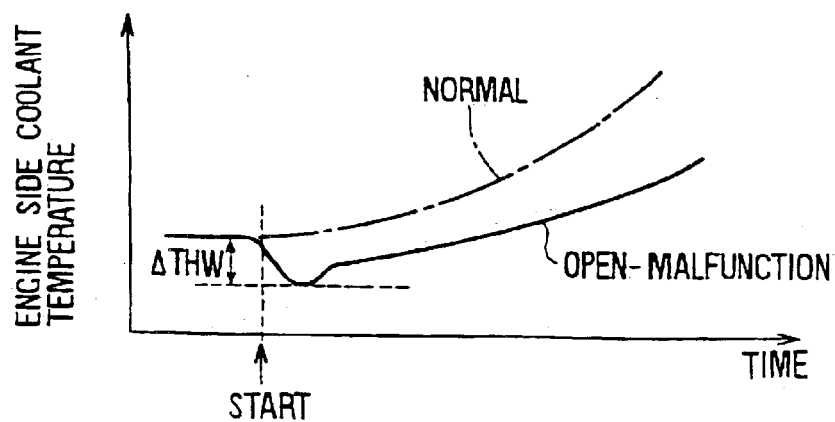
FIG. 2 is a time chart showing a method for diagnosing an open-malfunction (1)

At first, the first diagnosis of the open-malfunction will be explained with reference to FIG. 2 showing the behavior of the engine side coolant temperature after starting the engine when the open-malfunction of the thermostat 13 has occurred as compared with the case when the thermostat 13 operates normally. At the time of cold start when the engine 11 is started while it is cold, the engine side coolant temperature starts to rise quickly right after the start of the engine as shown by the dot-chain line because the valve in the thermostat is closed and the coolant is stopped from circulating when the thermostat 13 operates normally. However, the cold coolant within the radiator 15 is circulated through the engine 11 from the beginning of the start of the engine even during the cold start when the open-malfunction occurs, so that the engine side coolant temperature drops temporarily as shown by the solid line because the cold coolant on the radiator 15 side flows in right after the start of the engine even during the cold start. The engine side coolant temperature then rises up moderately. The temporary drop of the engine side coolant temperature right after the start of the engine which occurs during the open-malfunction is a phenomenon which occurs because the radiator side coolant temperature is lower than the engine side coolant temperature because the radiator is exposed to the outside cold air while the engine is kept stopped.

Figure 3:
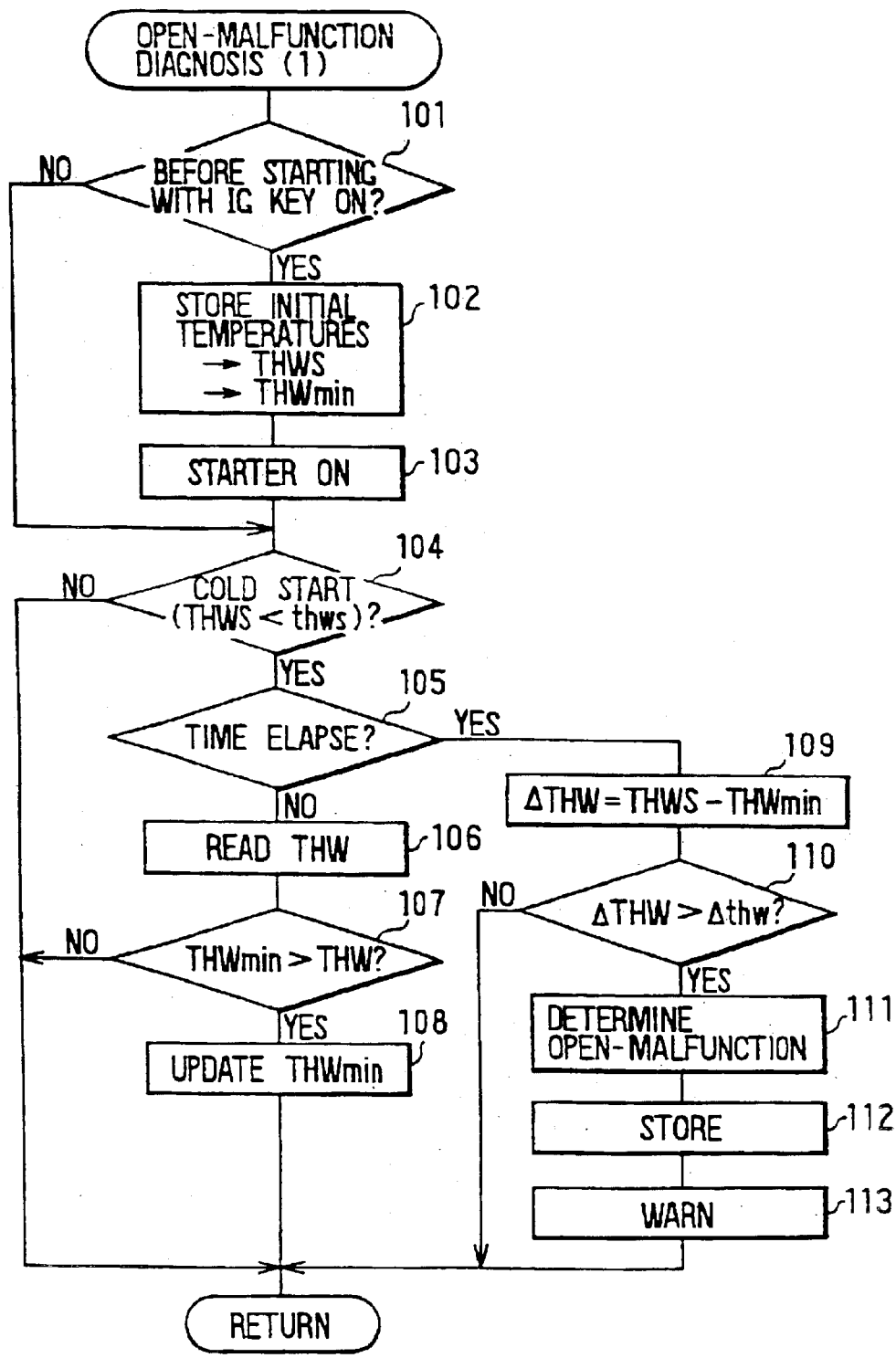
FIG. 3 is a flow chart showing a flow of processing steps of an open-malfunction diagnosing program for diagnosing the open-malfunction (1)

Based on this temporary drop of the engine side coolant temperature right after the start of the engine which occurs upon the open-malfunction, the first diagnosis of the open-malfunction is implemented whether the open-malfunction has occurred or not by determining the degree of drop of the engine side coolant temperature right after the start of the engine and by comparing the degree of drop with a reference value (reference). This open-malfunction detecting program shown in FIG. 3 is initiated per every predetermined time or every predetermined crank angle rotation after when an ignition key (IG key) is turned on.

When this program is initiated, it is determined at first in Step 101 whether or not the IG key is ON and the engine is not started yet. When the engine is not started yet, the process advances to Step 102 to store the engine side coolant temperature detected by the coolant temperature sensor 20 as initial values of a starting time coolant temperature THWS and a lowest coolant temperature THWmin. Then, the process advances to Step 103 to turn on a starter (not shown) to start the engine 11.

After that, it is determined in Step 104 whether it is the cold start or not by determining whether the starting time coolant temperature THWS is lower than a predetermined temperature thws which is set to be lower than a valve closing temperature of the thermostat 13. When it is not the cold start, the program is finished without implementing the diagnosing processes thereafter.

When it is the cold start on the other hand, the lowest coolant temperature THWmin is updated every time when the engine side coolant temperature THW drops during the period from the start until when a predetermined time elapses by the processes in Steps 105 through 108. The process advances to Step 109 at the time when the predetermined time has elapsed since the start of the engine to subtract the lowest coolant temperature THWmin up to then from the starting time coolant temperature THWS to find a decrease of engine side coolant temperature ΔTHW after the start of the engine.

After that, the decrease of engine side coolant temperature ΔTHW after the start is compared with the reference value Δthw in Step 110. If the decrease of engine side coolant temperature ΔTHW is greater than the reference value, the process advances to Step 111 to determine that the thermostat 13 has the open-malfunction. Then, this program ends by storing the information on the open-malfunction in the backup RAM 29 in Step 112 and by lighting or flashing the alarm lamp 28 to warn a driver in Step 113. It is noted that when the decrease of engine side coolant temperature ΔTHW is determined to be less than the reference value Δthw in Step 110, this program ends by determining that no open-malfunction exists.

Although the diagnosis of the open-malfunction has been implemented by the decrease of engine side coolant temperature ΔTHW after the start of this program, it may be implemented by the rate of drop of the engine side coolant temperature after the start (the rise of coolant temperature per predetermined time, the rise of coolant temperature per predetermined number of times of ignition or the rise of coolant temperature per predetermined quantity of heat generated by the engine).

(2) Second Diagnosis of Open-Malfunction

Figure 4:
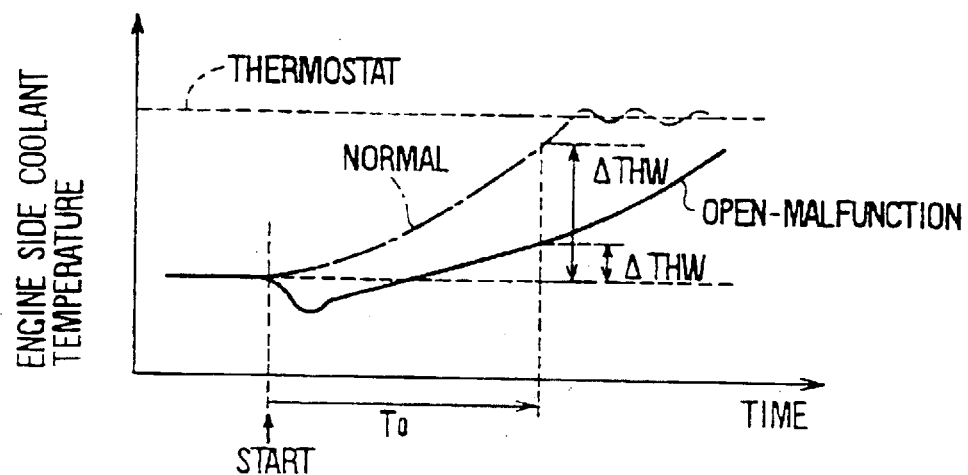
FIG. 4 is a time chart showing a method for diagnosing an open-malfunction (2)
Figure 7:
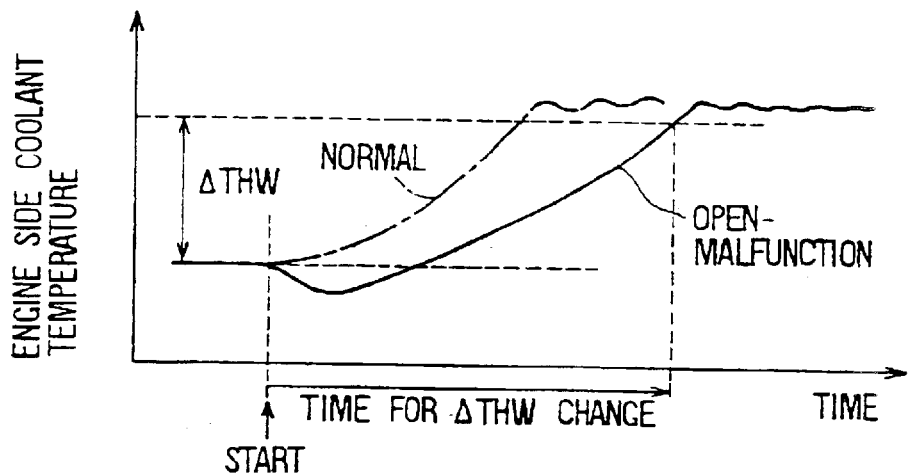
FIG. 7 is a time chart showing a method for diagnosing an open-malfunction (4)

As understood from FIG. 4, when the open-malfunction occurs, the cold coolant within the radiator 15 is circulated through the engine 11 from the beginning of the start of the engine 11 even during the cold start, so that the engine side coolant temperature rises considerably moderately as compared to the case when the thermostat 13 operates normally.

Figure 5:
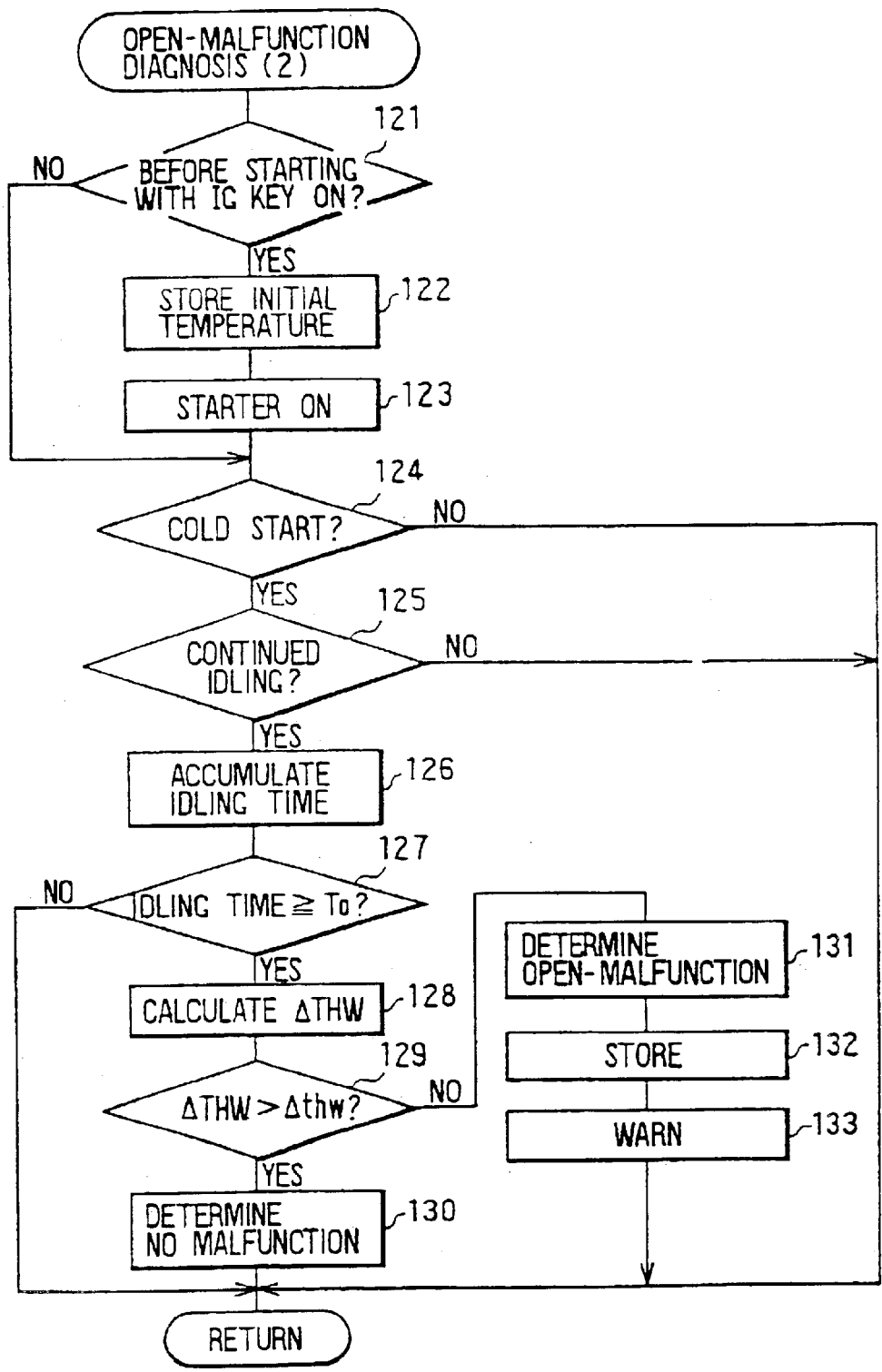
FIG. 5 is a flow chart showing a flow of processing steps of an open-malfunction diagnosing program for diagnosing the open-malfunction (2)

Based on this characteristic, the second diagnosis of the open-malfunction is implemented by determining the degree of rise of the engine side coolant temperature within a predetermined time after the start of the engine by an open-malfunction diagnosing program shown in FIG. 5.

When this program is initiated, the engine 11 is started after reading the coolant temperature at the time of starting similarly to the first diagnosis of the open-malfunction (1) in Steps 121 through 124 and when it is the case of the cold start, the processing steps after Step 125 are executed as follows. At first, a time during which an idling state is continuing from the cold start is accumulated by a post-start temporal timer in Steps 125 and 126. When the accumulated time becomes equal to the predetermined time to (in Step 127), the increase of engine side coolant temperature ΔTHW within the predetermined time to after the cold start is calculated by subtracting the coolant temperature at the starting time from the present engine side coolant temperature in Step 128.

When the idling state does not continue until the predetermined time to elapses after the cold start, i.e. when it is determined to be NO in Step 125, the program ends without implementing the diagnostic processing steps on and after Step 126. It is because the quantity of heat generated by engine fluctuates within the predetermined time and the increase of engine side coolant temperature ΔTHW fluctuates when the idling state does not continue for the predetermined time to.

When the idling state continues for the predetermined time to after the cold start, the increase of engine side coolant temperature ΔTHW calculated in Step 128 is compared with the reference value Δthw in Step 129. When the increase of engine side coolant temperature ΔTHW is greater than the reference value, i.e. when the speed of increase of the engine side coolant temperature is fast, the process advances to Step 130 to determine that the thermostat 13 is closed normally and ends the program.

When the increase of engine side coolant temperature ΔTHW is determined to be less than the reference value Δthw in Step 129 on the other hand, i.e. when the speed of increase of the engine side coolant temperature is slow, the process advances to Step 131 to determine that the thermostat 13 has the open-malfunction. Then, the program ends by storing the information on the open-malfunction in the backup RAM 29 in Step 132 and by lighting or flashing the alarm lamp 28 to warn the driver of that in Step 133.

It is noted that the open-malfunction has been diagnosed while the idling state continues in consideration of that the engine operating state may influence on the behavior of the engine side coolant temperature in the program, the open-malfunction may be diagnosed even in the operating state other than the idling state if there is a period during which the operating state is continuously almost constant.

(3) Third Diagnosis of Open-Malfunction

It is arranged so that the diagnosis would not be influenced by the fluctuation of the engine operating state in the second diagnosis of open-malfunction (2) by calculating the increase of engine side coolant temperature ΔTHW when the idling state is continuing for the predetermined time from the cold start in order to calculate the increase of coolant temperature ΔTHW within the predetermined time to after the cold start. Accordingly, the open-malfunction cannot be diagnosed unless the idling state continues for the predetermined time to from the cold start in the second diagnosis of the open-malfunction (2).

Therefore, in this third diagnosis of the open-malfunction (3), the influence of the fluctuation of the increase of the engine side coolant temperature caused by the fluctuation of the engine operating state is eliminated in order to be able to diagnose the open-malfunction accurately even when the idling state does not continue from the cold start by accumulating the quantity of heat generated by engine after the cold start and by calculating the increase of the engine side coolant temperature during the period until when the accumulated value reaches a predetermined value.

Figure 6:
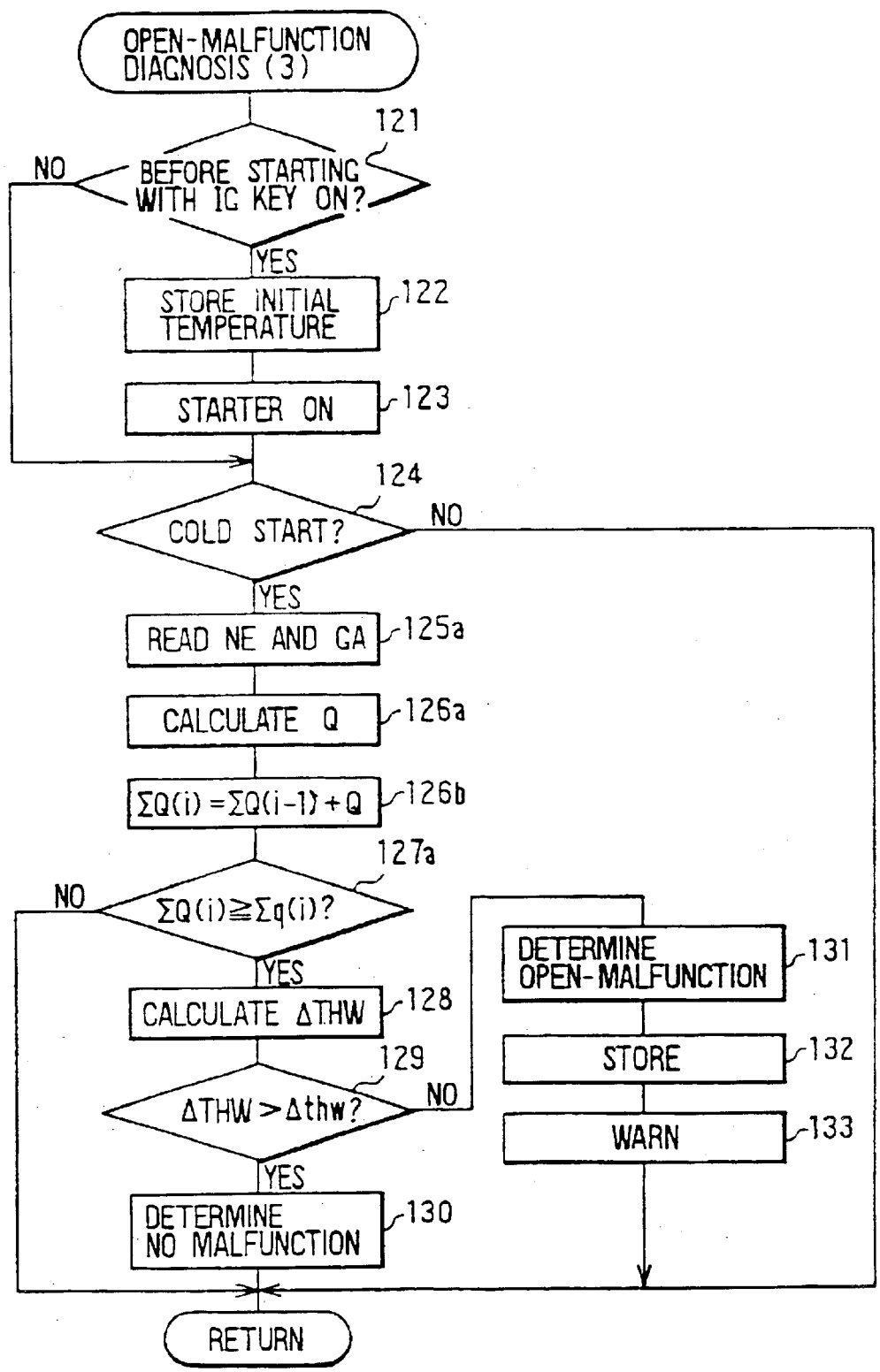
FIG. 6 is a flow chart showing a flow of processing steps of an open-malfunction diagnosing program for diagnosing an open-malfunction (3)

In this malfunction diagnosing program shown in FIG. 6 for implementing the third diagnosis of the open-malfunction, processing steps of this program are the same as those of the program shown in FIG. 5 and used in the second diagnosis of the open-malfunction (2) except for Steps 125a through 127a related to the calculation of the increase of the engine side coolant temperature.

After reading the engine speed NE and the intake air amount GA during the cold start in Step 125a, the quantity of heat Q generated by the engine 11 is calculated for the existing engine speed NE and the engine load GA/NE in Step 126a from a two-dimensional map of the quantity of heat Q parameterized by the engine speed NE and the load GA/NE. Then, the accumulated value of quantity of heat generated by engine $\Sigma Q(i)$ is updated by accumulating the latest quantity of heat generated by engine Q to the previously accumulated value of the quantity of heat generated by engine $\Sigma Q(i-1)$ in Step 126b and it is determined whether or not the accumulated value of quantity of heat generated by engine $\Sigma Q(i)$ up to this time has reached the predetermined value $\Sigma q(i)$ or not in Step 127a.

When the accumulated value of quantity of heat generated by engine $\Sigma Q(i)$ after the cold start has reached the predetermined value $\Sigma q(i)$, the process advances to Step 128 to calculate the increase of engine side coolant temperature $\Delta$THW after the cold start by subtracting the coolant temperature at the starting time from the present engine side coolant temperature. The processes thereafter are the same as those in the second diagnosis of the open-malfunction (2).

By calculating the increase of engine side coolant temperature $\Delta$THW until when the accumulated value of quantity of heat generated by engine $\Sigma Q(i)$ after the cold start reaches the predetermined value to diagnosis of the open-malfunction, the influence of the fluctuation of the increase of the engine side coolant temperature caused by the fluctuation of the engine operating state may be eliminated, allowing the accuracy in diagnosing the open-malfunction to be improved.

It is noted that the open-malfunction may be diagnosed by accumulating a number of times of ignition, instead of the quantity of heat Q generated by engine 11, and by calculating the increase of the engine side coolant temperature until when the accumulated value reaches the predetermined value. The influence of the fluctuation of the increase of the engine side coolant temperature caused by the fluctuation of the engine operating state may be reduced also in this case, allowing the accuracy in diagnosing the open-malfunction to be improved.

(4) Fourth Diagnosis of Open-Malfunction

Figure 8:
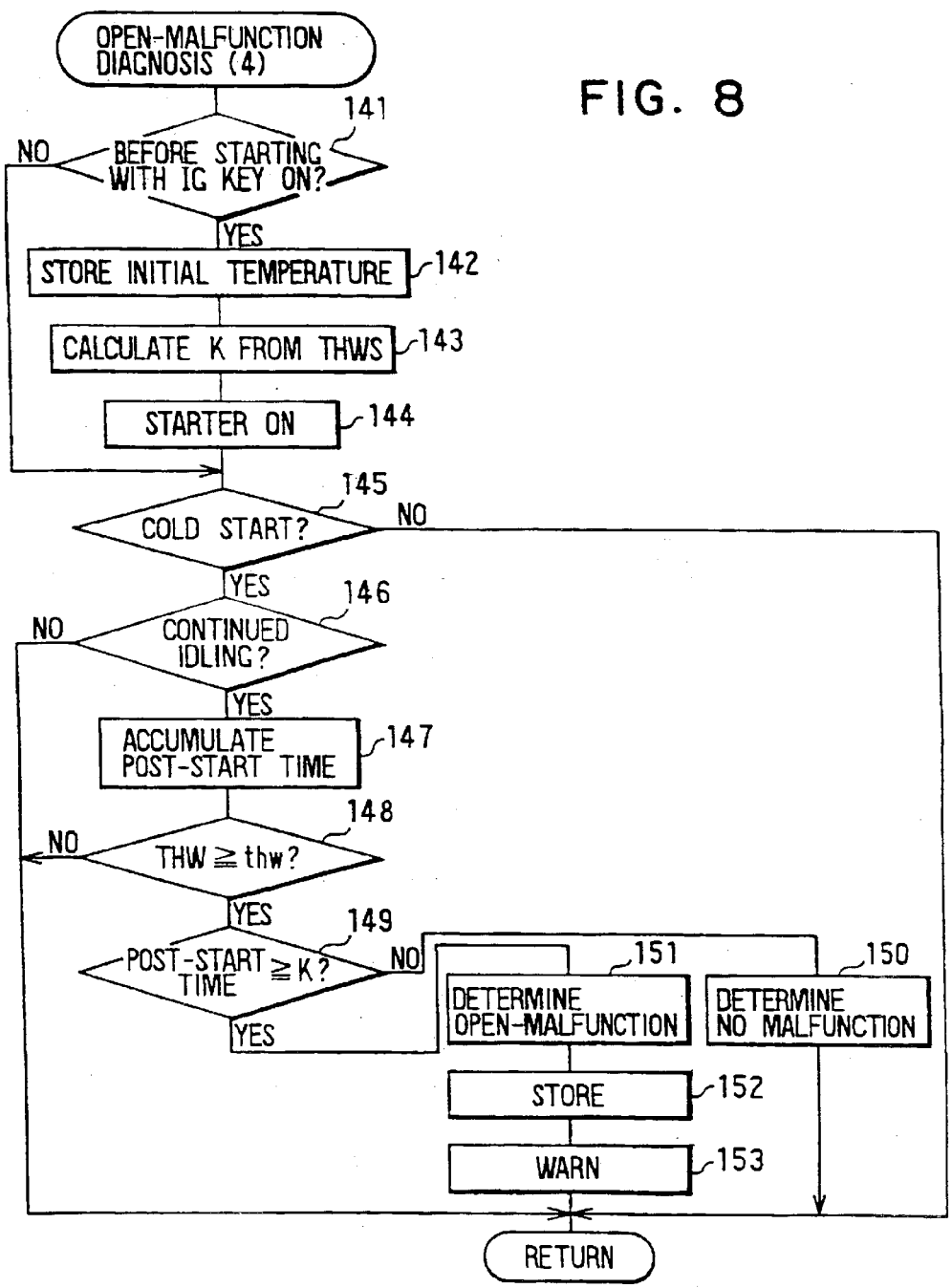
FIG. 8 is a flow chart showing a flow of processing steps of an open-malfunction diagnosing program for diagnosing the open-malfunction (4)

In the fourth diagnosis of the open-malfunction shown in FIG. 8, the starting time coolant temperature THWS is read before the start in Steps 141 and 142. Then, after calculating a reference value K for determining the open-malfunction corresponding to the starting time coolant temperature THWS by a preset map or equation in Step 143, the engine 11 is started in Step 144. Then, in case of the cold start, the time during which the idling state continues from the start is accumulated by a post-start temporal timer in Step 145 through 147. The accumulating operation of the post-start temporal timer is continued until when the engine side coolant temperature THW detected by the coolant temperature sensor 20 rises up to a predetermined temperature thw in Step 148.

When the accelerator or throttle valve is operated to terminate the idling state before the engine side coolant temperature THW rises to the predetermined temperature thw (when it is determined to be NO in Step 146), this program ends without implementing the diagnostic processes thereafter. It is because the quantity of heat generated by engine fluctuates and the increase of the engine side coolant temperature THW fluctuates when the idling state is terminated.

Then, when the idling state continues until when the engine side coolant temperature THW rises up to the predetermined temperature thw after the cold start, the accumulated time of the post-start temporal timer, i.e. the time required for the engine side coolant temperature THW to rises up to the predetermined temperature thw from the cold start, is compared with the reference value K calculated in Step 143. When this time is shorter than the reference value K, i.e. when the speed of increase of the engine side coolant temperature is fast, the process advances to Step 150 to determine that the thermostat 13 is closed normally and to end the program.

When it is determined in Step 149 that the time required for the engine side coolant temperature THW to rise up to the predetermined temperature thw is greater than the reference value K on the other hand, i.e. when the speed of increase of the engine side coolant temperature is slow, the process advances to Step 151 to determine that the thermostat 13 has the open-malfunction. Then, the program ends after storing the information on the open-malfunction in the backup RAM 29 in Step 152 and lighting or flashing the alarm lamp 28 to warn the driver of that in Step 153.

The reference value K for determining the open-malfunction corresponding to the starting time coolant temperature THWS is calculated in Step 143 in this program in consideration of that the time required for the engine side coolant temperature THW to rise up to the predetermined temperature after the cold start differs depending on the starting time coolant temperature THWS. Thereby, the open-malfunction may be diagnosed reliably without being influenced by the starting time coolant temperature THWS.

It is noted that the open-malfunction may be diagnosed by accumulating the time until when the increase of the engine side coolant temperature THW after the start reaches the predetermined value instead of accumulating the time until when the engine side coolant temperature THW rises up to the predetermined temperature. This method has a merit that the influence of the starting time coolant temperature THWS given to the accumulated time is lessened.

Further, the object of the accumulation may be changed from the elapsed time from the start to the quantity of heat generated by engine or the number of times of ignition. When the quantity of heat generated by engine is to be accumulated, it may be achieved by implementing the same procedure from Steps 125a through 126b shown in FIG. 6. Then, the open-malfunction may be diagnosed by comparing the accumulated value of the quantity of heat generated by engine (or number of times of ignition) until when the engine side coolant temperature reaches the predetermined temperature after the cold start or until when the increase of the engine side coolant temperature reaches the predetermined degree with the reference value. Thereby, the influence of the fluctuation of the engine side coolant temperature caused by the fluctuation of the engine operating state may be eliminated and the open-malfunction may be diagnosed accurately even if the idling state does not continue.

(5) Fifth Diagnosis of Open-Malfunction

Figure 9:
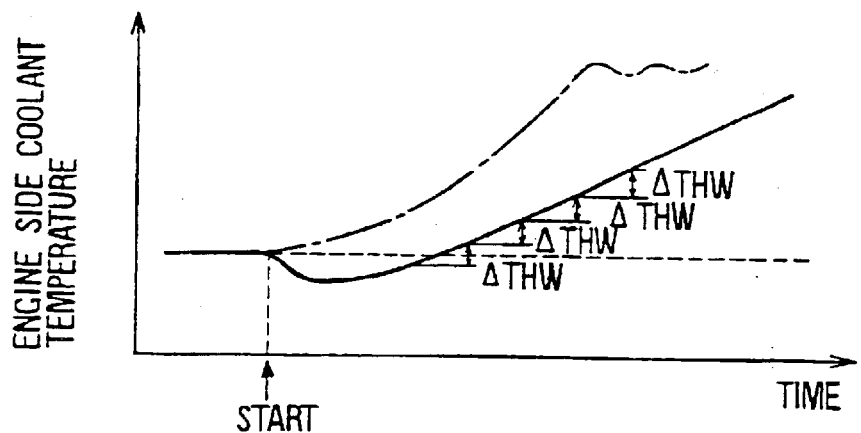
FIG. 9 is a time chart showing a method for diagnosing an open-malfunction (5)
Figure 10:
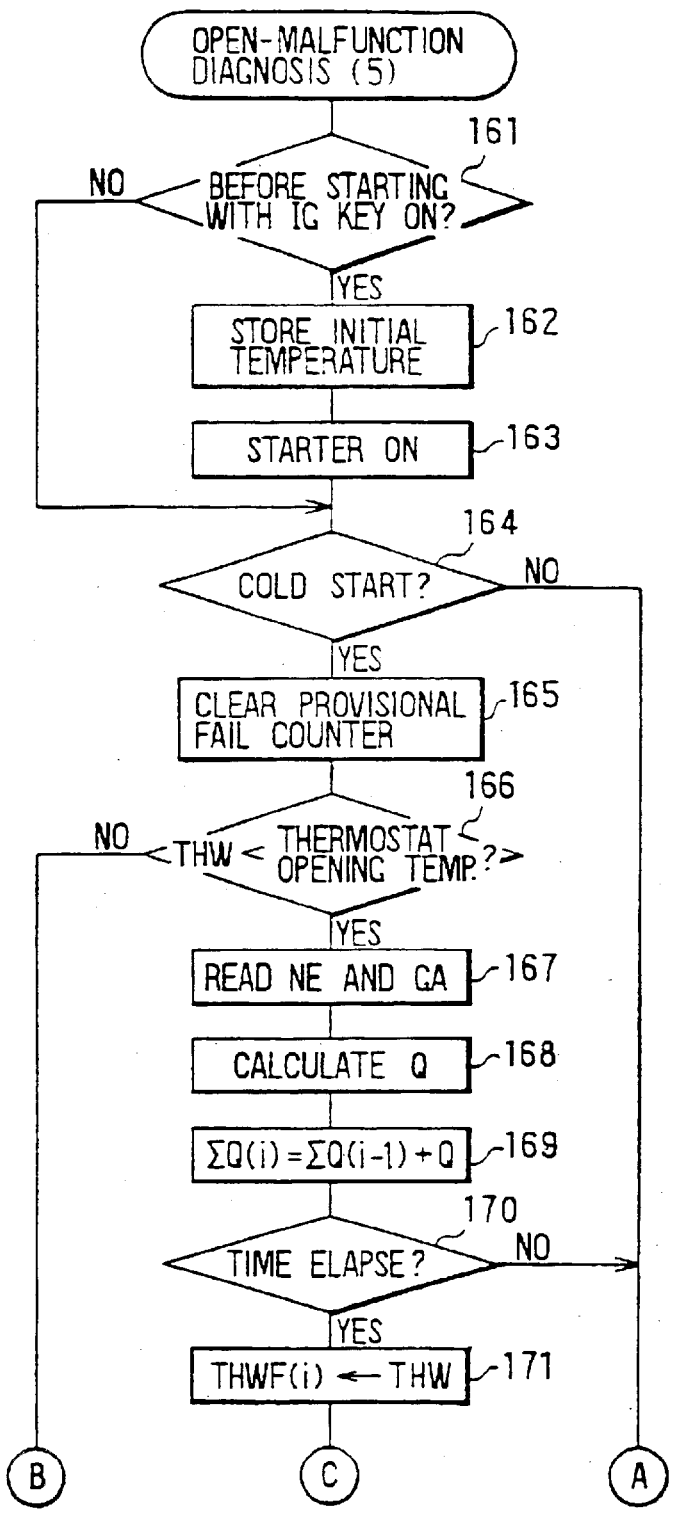
FIG. 10 is a flow chart showing a flow of processing steps of a first half part of an open-malfunction diagnosing program for diagnosing the open-malfunction (5)
Figure 11:
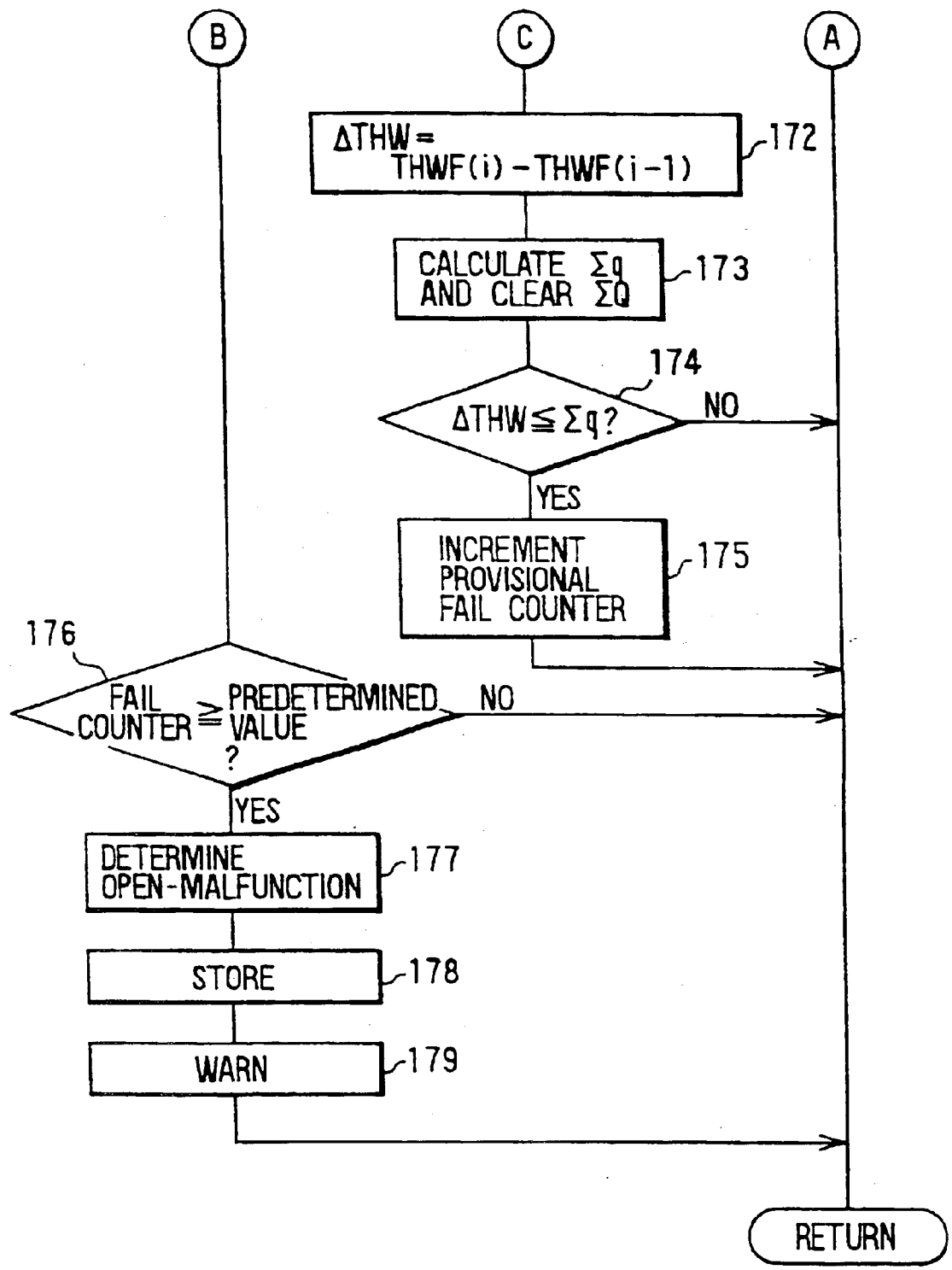
FIG. 11 is a flow chart showing a flow of processing steps of a second half part of the open-malfunction diagnosing program for diagnosing the open-malfunction (5)

In this fifth diagnosis, the increase of the engine side coolant temperature $\Delta$THW is determined per predetermined time after the start of the engine as shown in FIG. 9 to diagnose the open-malfunction based on the number of times when the increase of the engine side coolant temperature drops below a reference value. This diagnosing program is shown in FIGS. 10 and 11.

When this program is initiated, the engine 11 is started after reading the starting time coolant temperature in Steps 161 through 164 similarly to the first diagnosis of the open-malfunction. In case of the cold start, the processing steps after Step 165 are executed as follows. At first, a virtual or provisional fail counter is cleared in Step 165. Then, processes for calculating the increase of engine side coolant temperature ΔTHW within a predetermined time per predetermined time are repeated until when the engine side coolant temperature THW reaches the valve opening temperature of the thermostat 13 in the ensuing Steps 166 through 171.

That is, when the engine side coolant temperature THW is lower than the valve opening temperature of the thermostat 13, the quantity of heat generated by engine Q is calculated from the two-dimensional map from the engine speed NE and the intake air amount GA (load GA/NE) and the accumulated value of quantity of heat generated by engine ΣQ(i) is updated by accumulating the quantity of heat generated by engine Q of this time to the previously accumulated value of the quantity of heat generated by engine ΣQ(i−1) by the processes in Steps 167 through 169. This accumulated value of quantity of heat generated by engine ΣQ is used in calculating the reference value of the open-malfunction.

Then, the engine side coolant temperature THW at each moment is stored as the present coolant temperature THWF(i) in Step 171 every time when the predetermined time elapses and the increase of coolant temperature ΔTHW per predetermined time is calculated by subtracting the previous coolant temperature THWF(i−1) from the present coolant temperature THWF(i) in Step 172.

After that, the reference value Σq corresponding to the accumulated value of quantity of heat generated by engine ΣQ(i) within the predetermined time calculated in Step 169 is calculated by the map or expression set in advance in Step 173. Thereby, the reference value Σq, in which the influence of the fluctuation of the increase of the engine side coolant temperature caused by the fluctuation of the engine operating state is taken into consideration, is calculated. After calculating the reference value, the accumulated value of quantity of heat generated by engine ΣQ(i) is cleared. Then, the increase of coolant temperature ΔTHW per predetermined time is compared with the reference value calculated in Step 173. When the increase of coolant temperature ΔTHW is less than the reference value, there is a possibility of the open-malfunction, so that the process advances to Step 175 to increment the virtual fail counter and ends the program. It is noted that when the increase of coolant temperature ΔTHW per predetermined time is greater than the reference value, the program is finished without doing anything.

Thus, the processes of calculating the increase of coolant temperature ΔTHW per predetermined time to compare with the reference value and of incrementing the virtual fail counter when the ΔTHW≧reference value are repeated until when the engine side cool ant temperature THW reaches the valve opening temperature of the thermostat 13. When the engine side coolant temperature THW reaches the valve opening temperature, the above-mentioned process is finished. Then, the process advances to Step 176 to compare the value of the virtual fail counter with a predetermined value. When the value of the virtual fail counter is greater than the predetermined value, the process advances to Step 177 to determine that the thermostat 13 has the open-malfunction. Then, the program ends after storing the information on the open-malfunction in the backup RAM 29 in Step 178 and lighting or flashing the alarm lamp 28 to warn the driver of that in Step 179. It is noted that when it is determined that the value of the virtual fail counter is smaller than the predetermined value in Step 176, it is not determined to be the open-malfunction and the program ends.

Although the increase of coolant temperature ΔTHW per predetermined time has been calculated in this program, the increase of temperature per predetermined quantity of heat generated by engine or the increase of temperature per predetermined number of times of ignition may be calculated to compare with the reference value. In short, the thermostat 13 may be diagnosed whether it has the open-malfunction or not by periodically determining the increase of the engine side coolant temperature after the start of the engine and based 6n the number of times when the increase of the engine side coolant temperature is less than the reference value. Thereby, the open-malfunction may be diagnosed repeatedly based on the increase of the engine side coolant temperature and the open-malfunction may be diagnosed reliably.

While the thermostat 13 has been diagnosed whether it has the open-malfunction or not during idling (or during the period in which the almost constant operating state continues) by considering that the behavior of the engine side coolant temperature is influenced by the engine operating state and the behavior of the engine side coolant temperature has been determined based on the quantity of heat generated by engine or the number of times of ignition in each of the first through fifth diagnosis of the open-malfunction, the behavior of the engine side coolant temperature is influenced not only by the engine operating state but also by the factors such as the vehicle speed, outside temperature, intake air temperature and operating state of the air conditioner which influence the radiation of the coolant. Accordingly, the data such as the reference value, predetermined period and detected coolant temperature used in the diagnosis of the open-malfunction may be corrected based at least on one of the vehicle speed, outside temperature, intake air temperature and operating state of the air conditioner. Thereby, the open-malfunction may be diagnosed while taking the radiation of the coolant into consideration and the accuracy in diagnosing the open-malfunction may be improved that much.

Further, because no heat is generated by the engine when fuel is cut off, the elapsed time, the number of times of ignition and the quantity of heat generated by engine may be accumulated except for the period during which the fuel is cut off.

The diagnosis of the closure-malfunction during which the thermostat 13 is kept closed is implemented by either one of the following two methods.

(1) First Diagnosis of Closure-Malfunction

Figures 12, 16A, 16B, 16C:
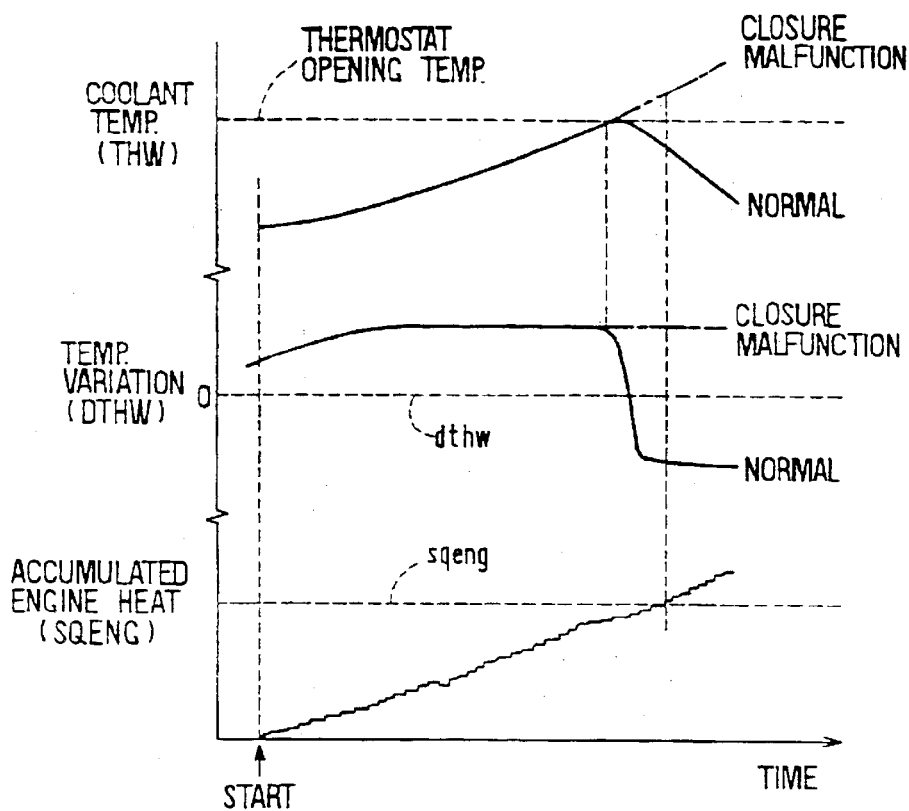
FIG. 12 is a time chart showing a method for diagnosing a closure-malfunction (1)
FIG. 16a is a table showing a map for calculating a correction factor KQTHA from an intake air temperature THA.
FIG. 16b is a table showing a map for calculating a correction factor KQSPD from a vehicle speed SPD.
FIG. 16c is a table showing a map for calculating a correction factor KQELB from a blower fan operating state ELB.

The first diagnosis of the closure-malfunction is made based on the behavior of the engine side coolant temperature when the closure-malfunction occurs in comparison with the case when the thermostat operates normally. As shown in FIG. 12, when the engine side coolant temperature exceeds a thermostat valve opening temperature, the valve of the thermostat 13 is opened when it is normal and the cold coolant on the radiator 15 side is circulated to the engine 11, thus dropping the engine side coolant temperature. When the thermostat 13 has the closure-malfunction on the other hand, the valve of the thermostat 13 is not opened, no coolant is circulated and the engine side coolant temperature continues to rise up.

The thermostat 13 is diagnosed whether it has the closure-malfunction or not by comparing the rate of change of the engine side coolant temperature with a reference value after when the engine side coolant temperature reaches the thermostat valve opening temperature. Here, the rate of change of the engine side coolant temperature may be determined by any one of the variation of coolant temperature per predetermined time, the variation of coolant temperature per predetermined number of times of ignition and the variation of coolant temperature per predetermined quantity of heat generated by engine.

Figure 13:
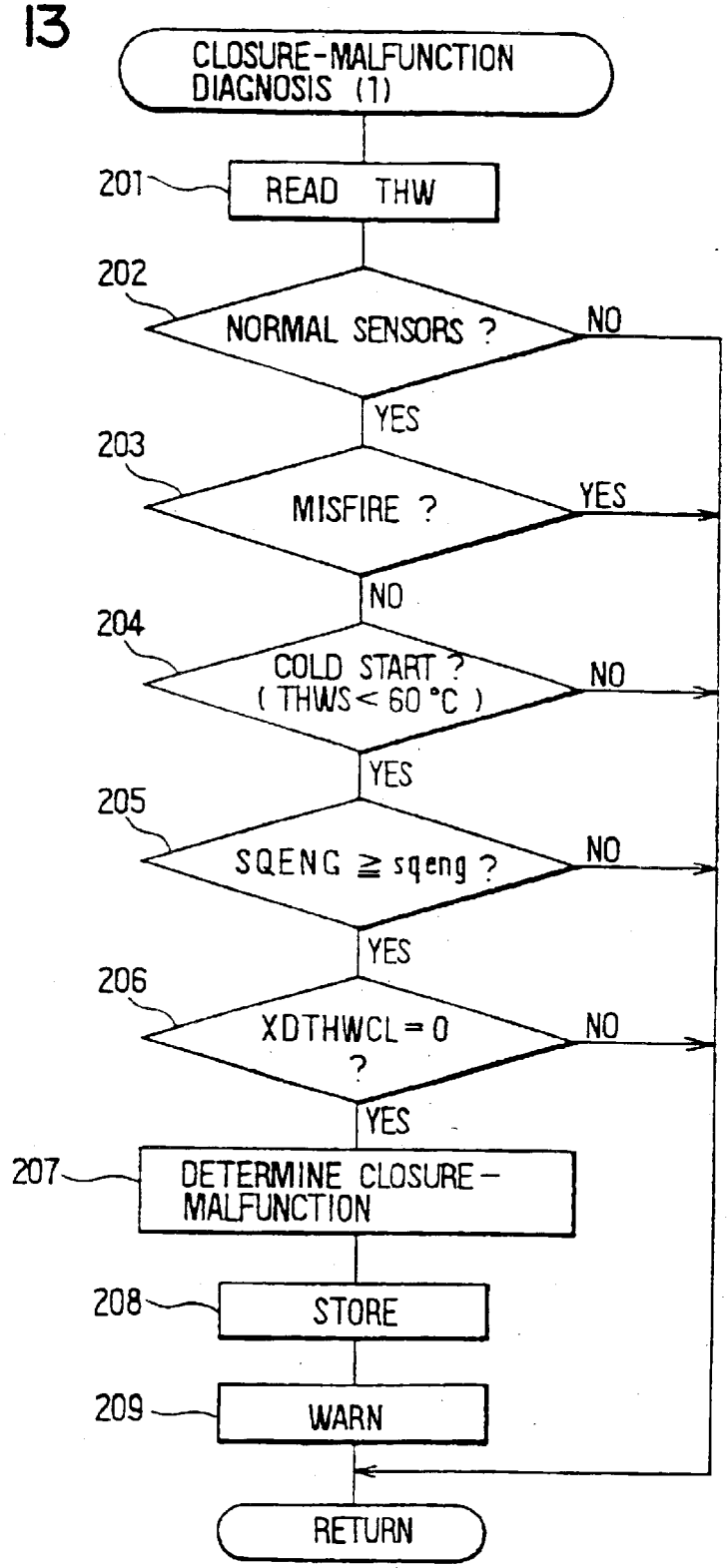
FIG. 13 is a flow chart showing a flow of processing steps of a closure-malfunction diagnosing program for diagnosing the closure-malfunction (1)

The processing steps of the closure-malfunction diagnosing program is shown in FIG. 13 and is initiated per every predetermined time (e.g. per 200 ms) after when the IG key has been turned on.

When the program is initiated, the engine side coolant temperature THW detected by the coolant temperature sensor 20 is read in Step 201. Then, it is determined whether the sensors (the coolant temperature sensor 20, the intake air amount sensor 24, the intake air temperature sensor 25 and the vehicle speed sensor 26) used in the diagnosis of the closure-malfunction are normal or not in Step 202. The determination whether those sensors are normal or not is made by determining whether the output voltage of the sensors are within a predetermined voltage range or not. When all the relevant sensors are determined to be abnormal, the program ends without implementing the processes thereafter because the diagnosis of the malfunction cannot be carried out normally.

When the sensors are normal, the process advances to Step 203 to determine whether misfire has occurred or not. When the misfire occurs, the quantity of heat generated by engine drops and the behavior of the engine side coolant temperature fluctuates, so that the program ends with implementing the processes thereafter.

When no misfire has occurred, the process advances to Step 204 to determine whether it is the cold start or not by determining whether the engine side coolant temperature THWS at the time of start is lower than 60° C. or not (the predetermined temperature less than the valve closing temperature of the thermostat 13). When it is not the cold start, the program ends without implementing the processes thereafter.

When it is the cold start, the process advances to Step 205 to determine whether the accumulated value of quantity of heat generated by engine SQENG accumulated by a program for accumulating quantity of heat generated by engine described later with reference to FIG. 14 has reached the reference quantity of heat (sqeng) or not. The reference quantity of heat is the quantity of heat generated by engine necessary for the normal thermostat 13 to open the valve reliably after the cold start. Accordingly, when the accumulated value of quantity of heat generated by engine SQENG has not reached the reference quantity of heat, the program ends without implementing the processes thereafter.

When the accumulated value of quantity of heat generated by engine SQENG has reached the reference quantity of heat on the other hand, the process advances to Step 206 to determine whether or not a closure-malfunction flag XDTHWCL which is set by a closure-malfunction flag setting program described later with reference to FIG. 16 is "0", meaning the closure-malfunction. It is noted that the closure-malfunction flag XDTHWCL is set at "1" which means normal during the initialization.

When the closure-malfunction flag XDTHWCL is "0" meaning the closure-malfunction, the process advances to Step 207 to determine that the thermostat 13 has the closure-malfunction. Then, the program ends after storing the information on the closure-malfunction (engine speed, intake air amount, engine side coolant temperature, vehicle speed and a malfunction mode at the time of the closure-malfunction) in the backup RAM 29 in Step 208 and lighting or flashing the alarm lamp 2B to warn the driver of that in Step 209.

Accumulation of heat generated by engine is attained by the program shown in FIG. 14 and is initiated per predetermined time (e.g. per 100 ms) after when the IG key has been turned on and accumulates the quantity of heat generated by engine after the start as follows. At first, an intake air mount GA, an intake air temperature THA, a vehicle speed SPD and an operating state ELB of a blower fan of the air conditioner 27 are read in Step 221. It is then determined in Step 222 whether fuel is being cut off or not. The quantity of heat generated by engine becomes zero and the engine side coolant temperature drops due to the radiation during when the fuel is cut off. Accordingly, the process advances to Step 226 when the fuel is being cut off to subtract a predetermined value (e.g. 10) from the previously accumulated value of the quantity of heat generated by engine SQENG(i−1) to cancel the influence of the fuel cut off.

Figures 14, 15:
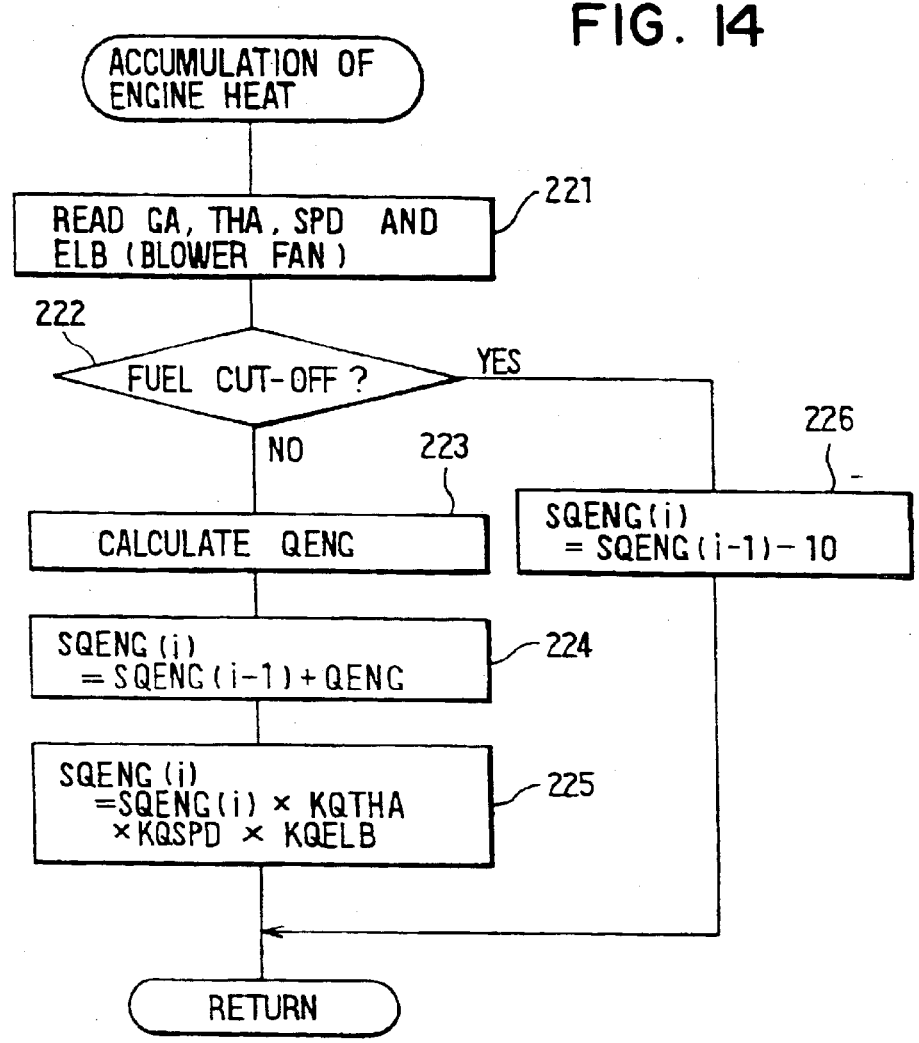
FIG. 14 is a flow chart showing a flow of processing steps of a program for integrating quantity of heat generated by an engine.
FIG. 15 is a table showing a map for calculating a quantity of heat generated by the engine QENG from an intake air amount GA.

When the fuel is not being cut off on the other hand, the process advances to Step 223 to calculate the quantity of heat generated by engine QENG in response to the intake air amount GA from a map shown in FIG. 15. It is noted that the intake air pressure or fuel injection amount may be used instead of the intake air amount GA as the parameter for calculating the quantity of heat generated by engine QENG.

After calculating the quantity of heat generated by engine QENG, the process advances to Step 224 to accumulate the quantity of heat generated by engine QENG of this time to the previously accumulated value of the quantity of heat generated by engine SQENG(i−1) to update the accumulated value of quantity of heat generated by engine SQENG(i). After that, the accumulated value of quantity of heat generated by engine SQENG(i) is corrected by multiplying correction factors KQTHA, KQSPD and KQEPB corresponding to the intake air temperature THA, the vehicle speed SPD and the operating state of the blower fan of the air conditioner 27 ELB in Step 225.

The correction factor KQTHA corresponding to the intake air temperature THA is calculated corresponding to the intake air amount GA from a map shown in FIG. 16a. It is noted that the outside air temperature may be used instead of the intake air temperature THA. The correction factor KQSPD corresponding to the vehicle speed SPD is calculated corresponding to the vehicle speed SPD from a map shown in FIG. 16b. The correction factor KQELB corresponding to the operating state of the blower fan ELB is calculated corresponding to ON/OFF of the blower fan from a map shown in FIG. 16c.

The accumulated value of quantity of heat generated by engine SQENG(i) is corrected corresponding to the intake air temperature THA, the vehicle speed SPD and the operating state of the blower fan ELB, because the radiation of the coolant is influenced and the behavior of the engine side coolant temperature is fluctuated by all of the intake air temperature THA, the vehicle speed SPD and the operating state of the blower fan ELB. It is noted that because the radiation of the coolant changes depending on the operation modes of the blower fan (strong/weak blow, introduction of outside air or air is circulated within the compartment), the correction factor KQELB may be changed depending on the operation modes.

Figure 17:
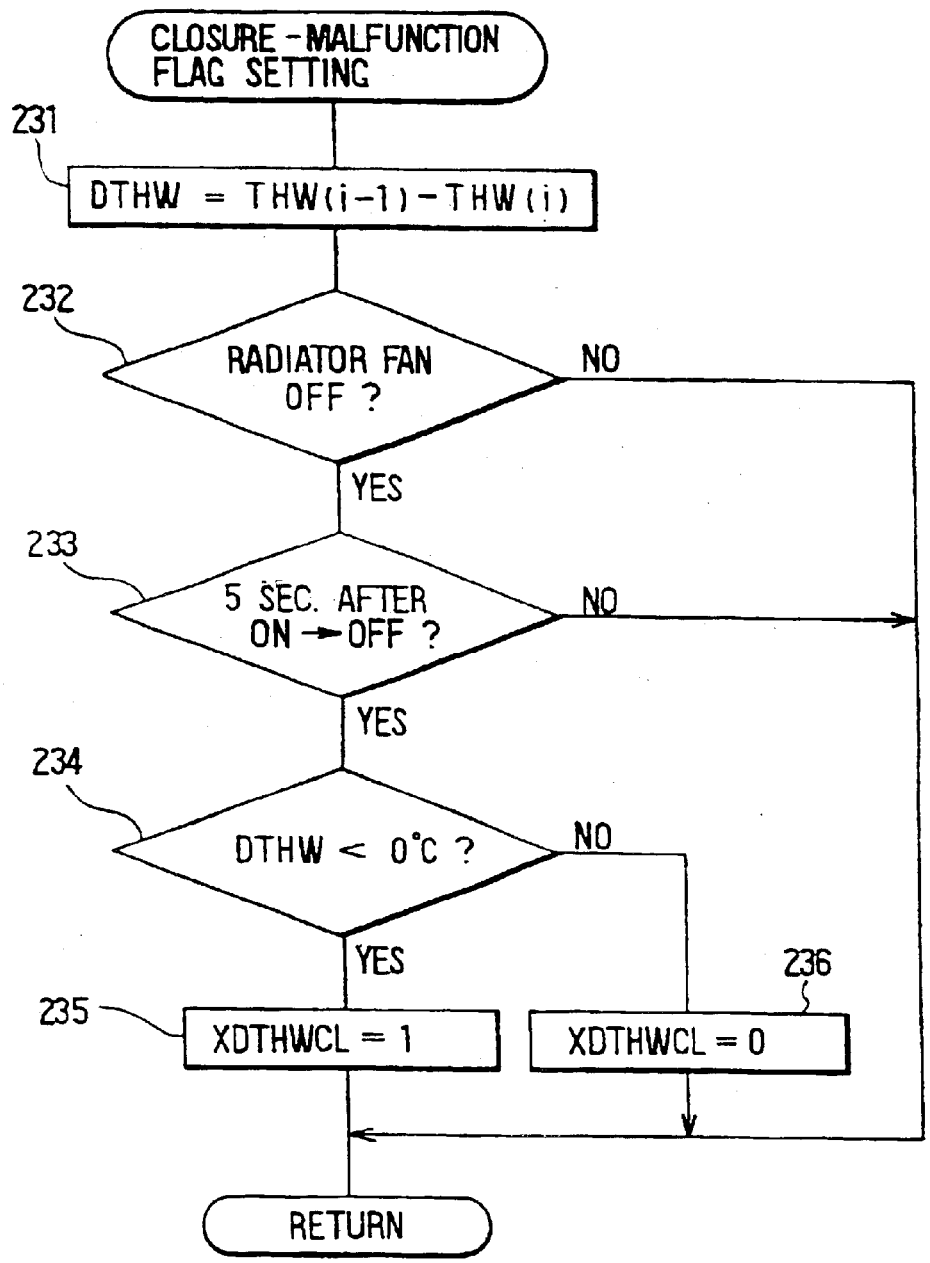
FIG. 17 is a flow chart showing a flow of processing steps of a closure-malfunction flag setting program.
Figure 18:
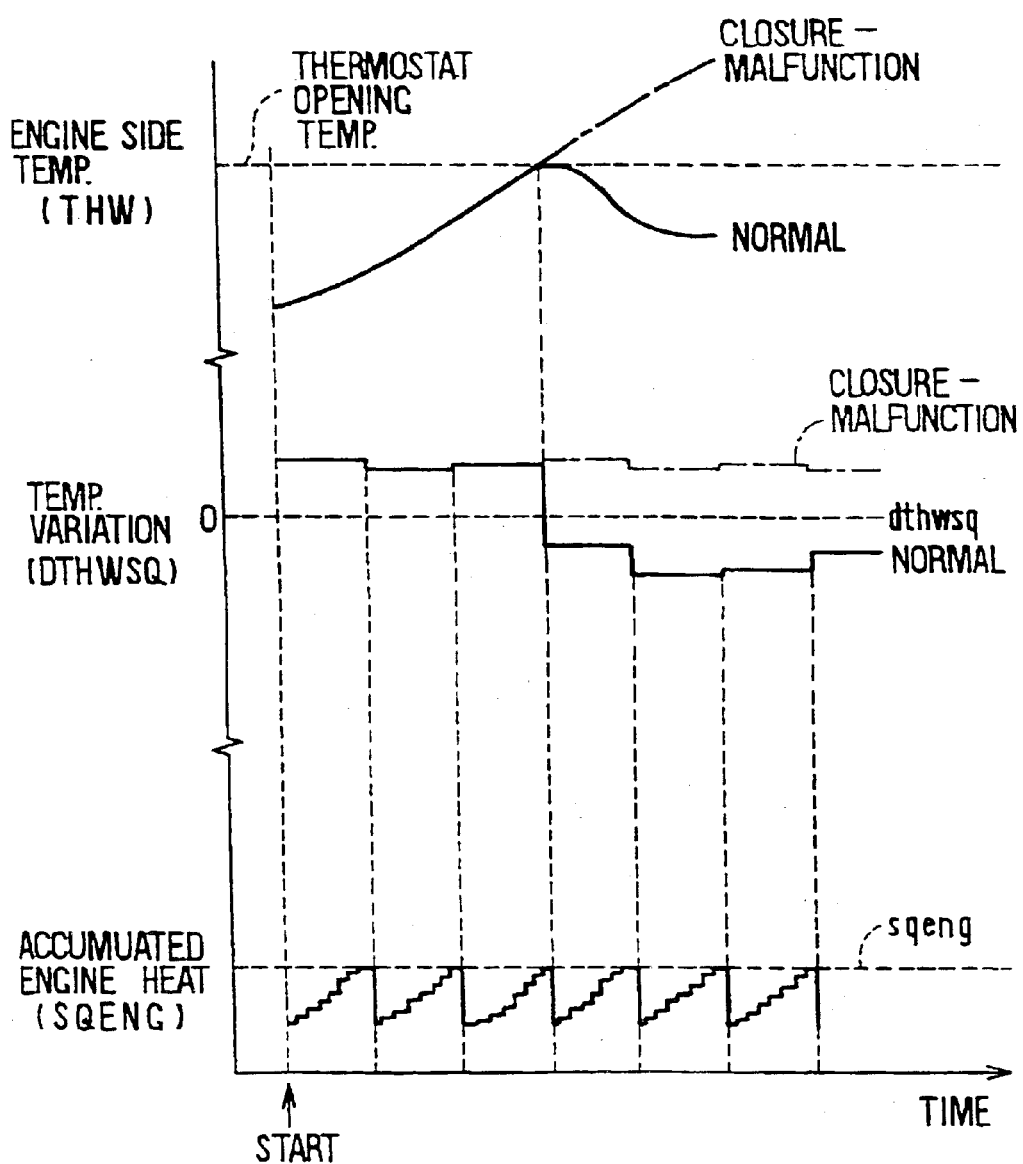
FIG. 18 is a time chart showing a method for diagnosing a closure-malfunction (2)

The closure-malfunction flag setting program is shown in FIG. 17 and is initiated per predetermined time (e.g. per 100 ms) after when the IG key has been turned on and sets the closure-malfunction flag XDTHWCL as follows. At first, the variation of the engine side coolant temperature DTHW per predetermined time (e.g. per 100 ms) is calculated by subtracting the engine side coolant temperature THW(i) of this time from the previous engine side coolant temperature THW(i−1) in Step 231.

After that, it is determined whether the electrically driven radiator fan 18 is off or not in Step 232. When the radiator fan 18 is OFF, the process advances to Step 233 to determine whether a predetermined time (e.g. five seconds) has elapsed or not after when the radiator fan 18 has been switched from ON to OFF. When this time has elapsed, the process advances to Step 234 to determine the closure-malfunction. When the response of either one of the Steps 232 and 233 is "No", i.e. the radiator fan 18 is ON or the predetermined time (e.g. five seconds) has not elapsed from when the radiator fan 1B is switched from ON to OFF, the program ends without determining the closure-malfunction so as not to be influenced by the heat radiation of the coolant caused by the flow of the radiator fan 18.

When the predetermined time (e.g. five seconds) has elapsed since when the radiator fan 18 has been turned off, the variation of the coolant temperature DTHW is compared with the reference value dthw (e.g. 0° C.) in Step 234. When the variation of the coolant temperature DTHW is smaller than the reference value, the thermostat 13 is assumed to be opening normally, so that the program ends by advancing to Step 235 to set the closure-malfunction flag XDTHWCL at "1" indicating that the thermostat 13 is normal.

When the variation of coolant temperature DTHW is greater than the reference value dthw on the other hand, i.e. when the engine side coolant temperature THW continuously rises up abnormally, the process advances to Step 236 to set the closure-malfunction flag XDTHWCL at "0" indicating the closure-malfunction and ends the program. It is noted that the reference value which is compared with the variation of coolant temperature DTHW in Step 234 is not limited only to 0° C. and may be a plus temperature.

(2) Second Diagnosis of Closure-Malfunction

While the variation of coolant temperature DTHW per predetermined time has been calculated in the first diagnosis of the closure-malfunction, the variation of coolant temperature DTHWSQ per predetermined quantity of heat generated by engine is calculated in the second diagnosis of closure-malfunction. Further, while the closure-malfunction has been diagnosed when the accumulated value of the quantity of heat generated by engine after the start reached the predetermined value in the first diagnosis of closure-malfunction, the diagnosis of closure-malfunction is implemented when the engine side coolant temperature exceeds the valve opening temperature of the thermostat 13 by a predetermined temperature.

Figure 19:
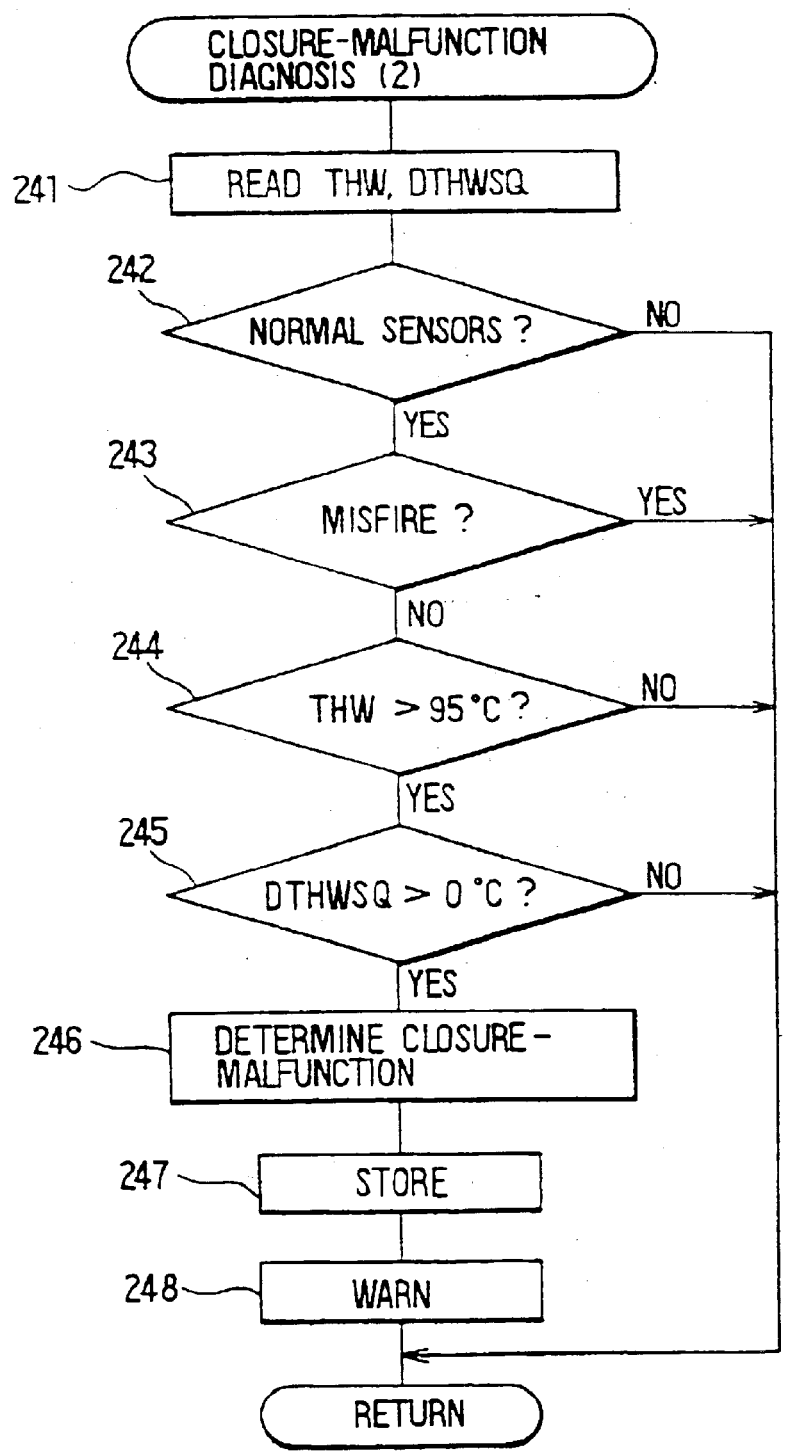
FIG. 19 is a flow chart showing a flow of processing steps of an open-malfunction diagnosing program for diagnosing the closure-malfunction (2)

The second diagnosis of closure-malfunction is shown in FIG. 19 and is initiated per every predetermined time (e.g. per 200 ms) after when the IG key has been turned.

When the program is initiated, the engine side coolant temperature THW detected by the coolant temperature sensor 20 is read and the variation of coolant temperature DTHWSQ per predetermined quantity of heat generated by engine calculated by the coolant temperature variation calculating program shown in FIG. 19 is read in Step 241. When it is determined that the sensors such as the coolant temperature sensor 20 used in the diagnosis of closure-malfunction are normal and no misfire has occurred in Steps 242 and 243, the process advances to Step 244 to compare the engine side coolant temperature THW with a temperature such as 95° C. which is higher than the valve opening temperature (e.g. 90° C.) of the thermostat 13 by a predetermined temperature (e.g. 5° C.). This temperature causes the thermostat 13 to open certainly if the thermostat 13 is normal. Accordingly, the program ends without implementing the diagnostic processes thereafter when the engine side coolant temperature THW is less than 95° C.

When the engine side coolant temperature THW exceeds 95° C. on the other hand, the process advances to Step 245 to compare the variation of coolant temperature DTHWSQ per predetermined quantity of heat generated by engine with the reference value dthwsq (e.g. 0° C.). When the variation of coolant temperature DTHWSQ is less than the reference value, the thermostat 13 is assumed to be opening normally, so that the program ends without implementing the processes thereafter.

When the variation of coolant temperature DTHWSQ is greater than the reference value, it means that the engine side coolant temperature THW is continuously rising up abnormally, so that the process advances to Step 246 to determine that the thermostat 13 has the closure-malfunction. Then, the program ends after storing the information on the closure-malfunction in the backup RAM 29 in Step 247 and lighting or flashing the alarm lamp 28 to warn the driver of that in Step 248.

Figure 20:
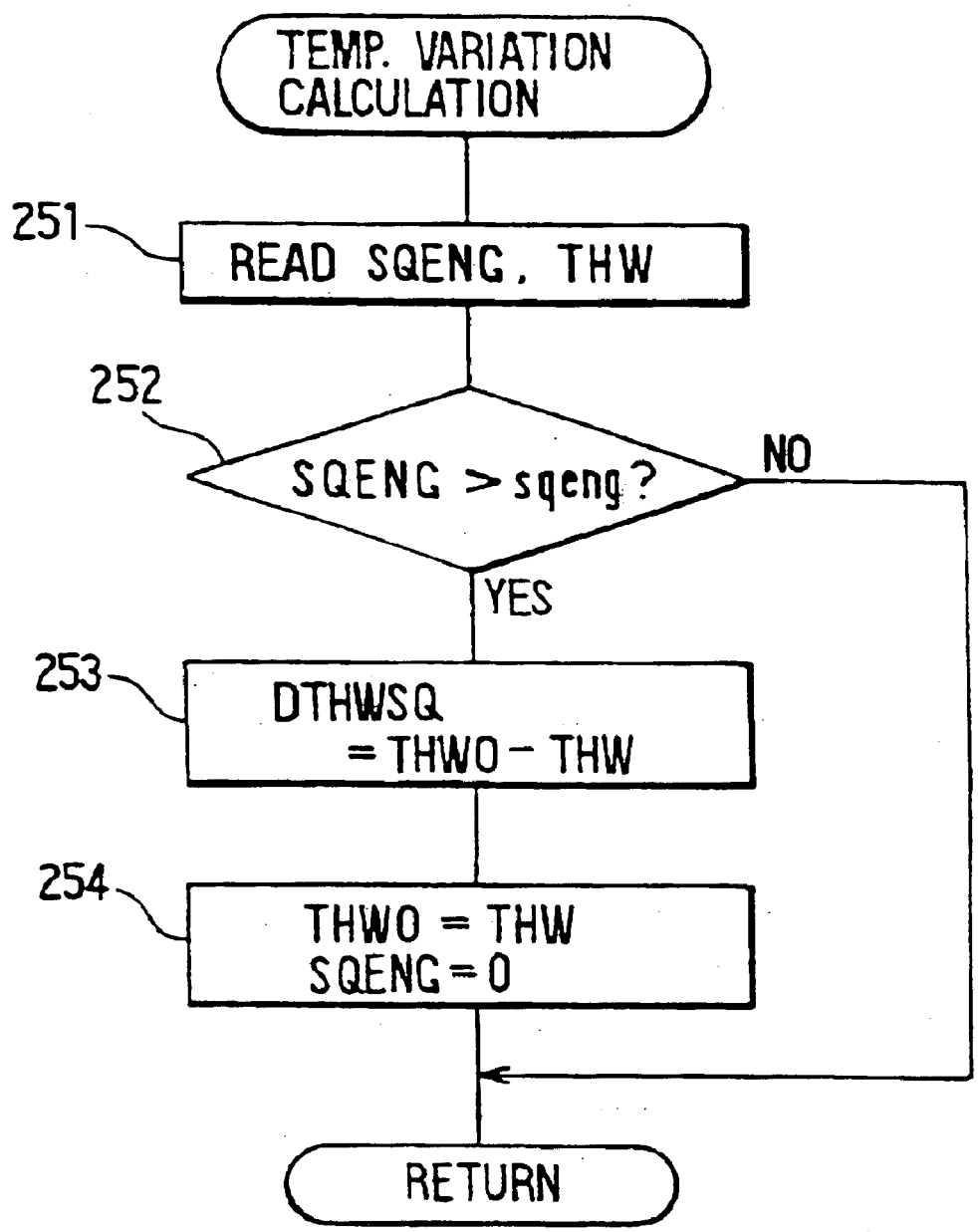
FIG. 20 is a flow chart showing a flow of processing steps of a coolant temperature variation calculating program.

The coolant temperature variation calculating program shown in FIG. 20 is initiated per predetermined time (e.g. per 100 ms) after when the IG key has been turned on and calculates the variation of coolant temperature DTHWSQ per predetermined quantity of heat generated by engine as follows. At first, the accumulated value of quantity of heat generated by engine SQENG calculated by the program for accumulating the quantity of heat generated by engine described before with reference to FIG. 14 and the engine side coolant temperature THW are read in Step 251.

After that, it is determined whether the accumulated value of quantity of heat generated by engine SQENG has exceeded the predetermined value (FIG. 17) or not. The variation DTHWSQ of the engine side coolant temperature is calculated by subtracting the coolant temperature THW of this time from the previous coolant temperature THWO in Step 253 every time when the accumulated value of quantity of heat generated by engine SQENG exceeds the predetermined value. After that, the program ends after updating the previous coolant temperature THWO by the coolant temperature THW of this time and clearing the accumulated value of quantity of heat generated by engine SQENG.

It is noted that although the variation of coolant temperature DTHWSQ per predetermined quantity of heat generated by engine has been calculated in this program, the variation of coolant temperature per predetermined number of times of ignition may be calculated. Further, the variation of coolant temperature per predetermined time may be calculated during the period in which the idling state continues or an almost constant operating state continues.

It is noted that although the radiator fan 18 has been composed of the electrically driven fan in the example of the system structure of FIG. 1, the radiator fan may be linked with the water pump 17 so that the radiator fan and the water pump 17 are driven together by the power of the engine. Further, the position where the thermostat 13 is mounted is not limited only to the outlet part of the water jacket 12. It may be mounted at the inlet part or other parts of the water jacket 12.

The above first embodiment may be arranged such that only either one of the open-malfunction diagnosing program or the closure-malfunction diagnosing program is implemented.

(Second Embodiment)

A second embodiment of the present invention will be explained below with reference to FIGS. 21 through 28.

Figure 21:
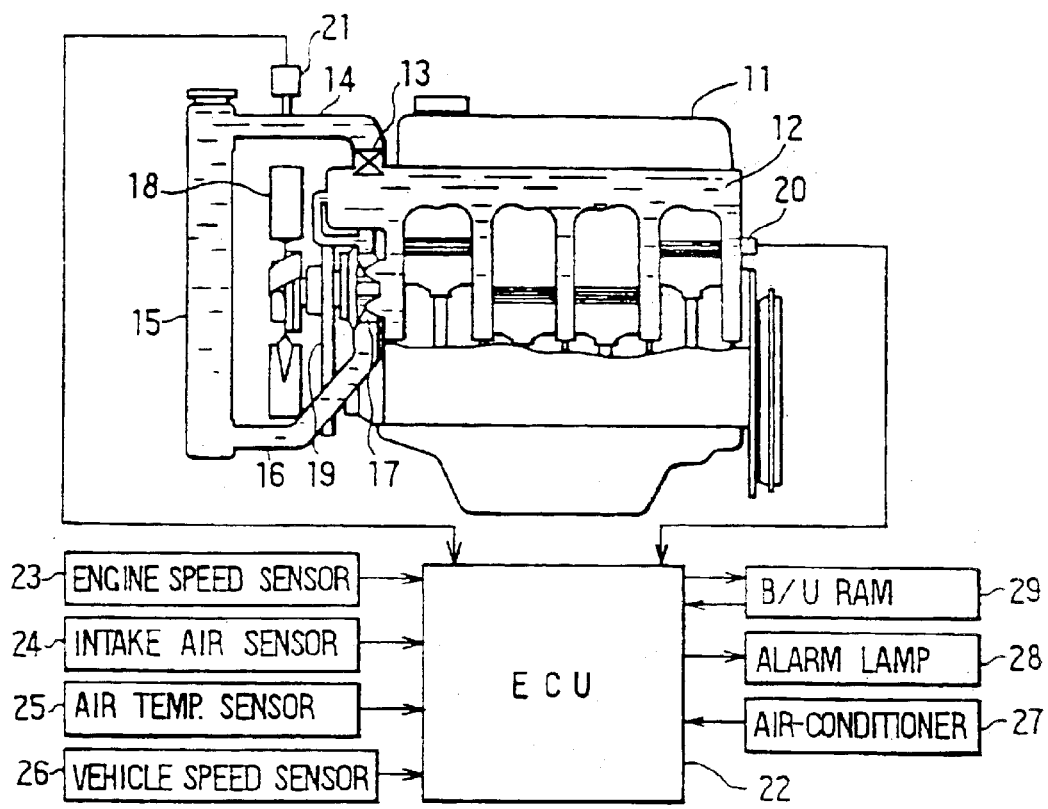
FIG. 21 is a block diagram showing the structure of the whole engine cooling system according to a second embodiment of the present invention.

While the cooling system of the engine 11 shown in FIG. 21 is similar to that of the first embodiment shown in FIG. 1, the water pump 17 is provided at the inlet of the water jacket 12 and is linked with a cooling fan 18 provided behind the radiator 15 so that the water pump 17 and the radiator fan 18 are driven together by engine power transmitted via the belt 19. The circulation of the coolant within the coolant circulating path is accelerated by the rotation of the water pump 17 and the heat radiating effect of the radiator 15 is enhanced by the rotation of the cooling fan 18 to accelerate the cooling of the coolant within the radiator 15.

In addition to the engine side coolant temperature sensor 20, a radiator side coolant temperature sensor 21 for detecting the temperature of the coolant (radiator side coolant temperature) supplied to the engine 11 is provided on the way of the coolant circulating path 14 on the radiator 15 side from the thermostat 13. It is noted that the position where the radiator side coolant temperature sensor 21 is mounted may be any place on the coolant circulating path on the radiator 15 side from the thermostat 13 and may be provided on the radiator 15 for example.

Figure 22:
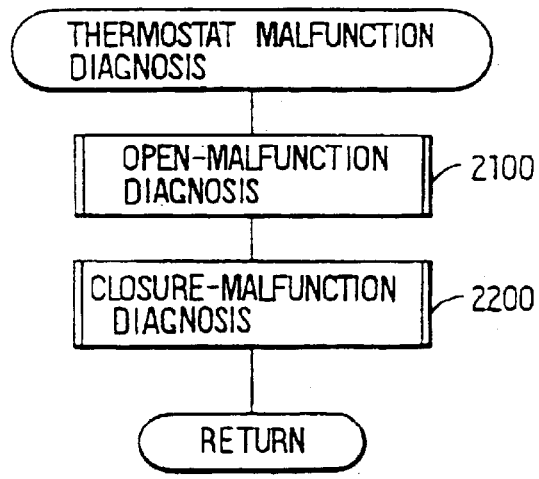
FIG. 22 is a flow chart showing a flow of processing steps of a main program for diagnosing a malfunction of a thermostat.
Figure 23:
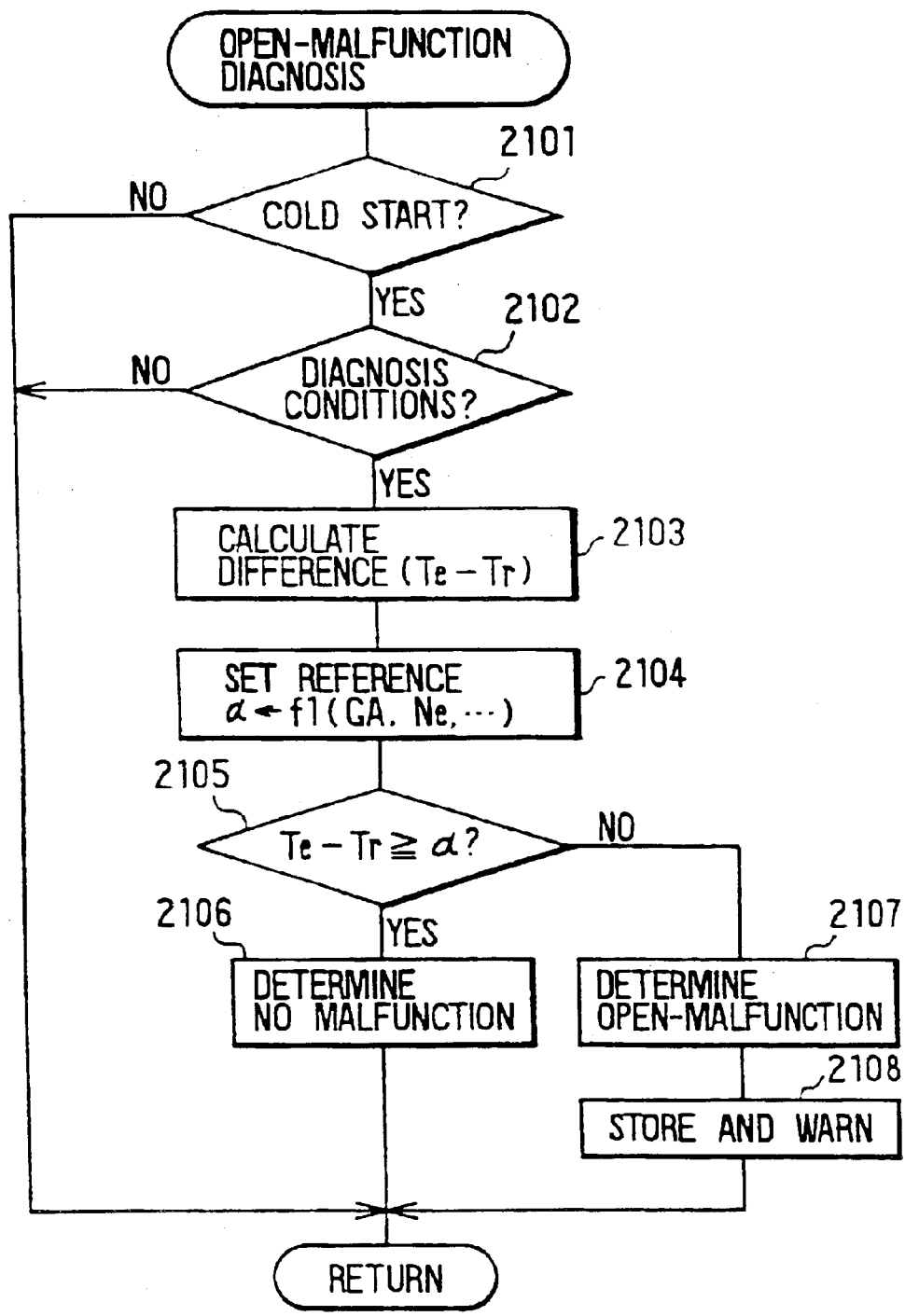
FIG. 23 is a flow chart showing a flow of processing steps of an open-malfunction diagnosing program.
Figure 24:
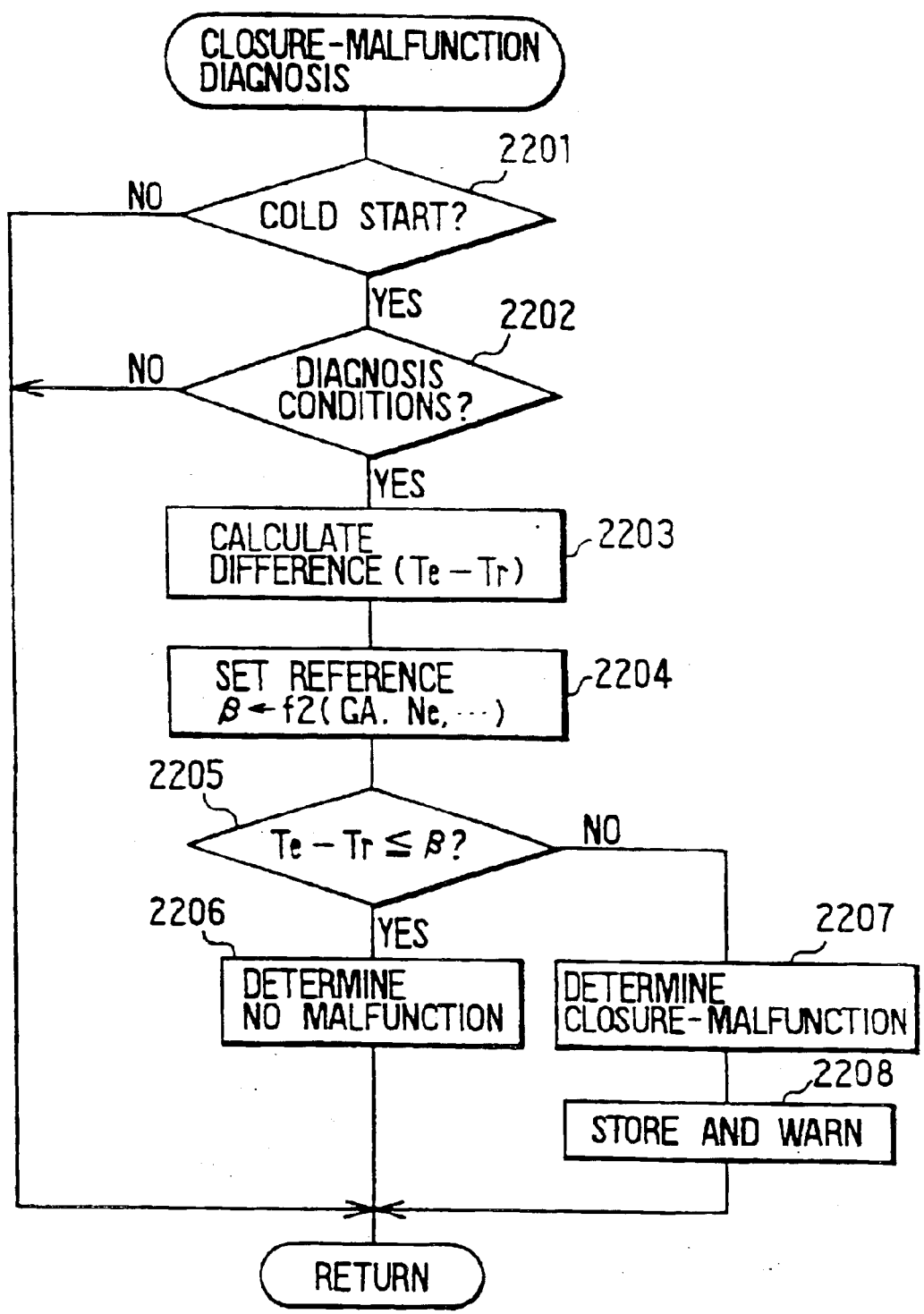
FIG. 24 is a flow chart showing a flow of processing steps of a closure-malfunction diagnosing program.

Programs for diagnosing the thermostat malfunction shown in FIGS. 22 through 24 are stored in a ROM built within the ECU 22. The thermostat 13 is diagnosed whether it has the open-malfunction or the closure-malfunction by executing those programs.

The malfunction diagnosing program for controlling the processes of the whole diagnosis of the malfunction of the thermostat is repeatedly activated per predetermined time or per crank angle after when the ignition switch not shown is turned on. When this program is initiated, an open-malfunction diagnosing program shown in FIG. 23 is executed in Step 2100 to diagnose whether the open-malfunction in which the thermostat 13 is kept opened occurred or not. After that, a closure-malfunction diagnosing program shown in FIG. 24 is executed in Step 2200 to diagnose whether the closure-malfunction in which the thermostat 13 is kept closed occurred or not.

Figure 25:
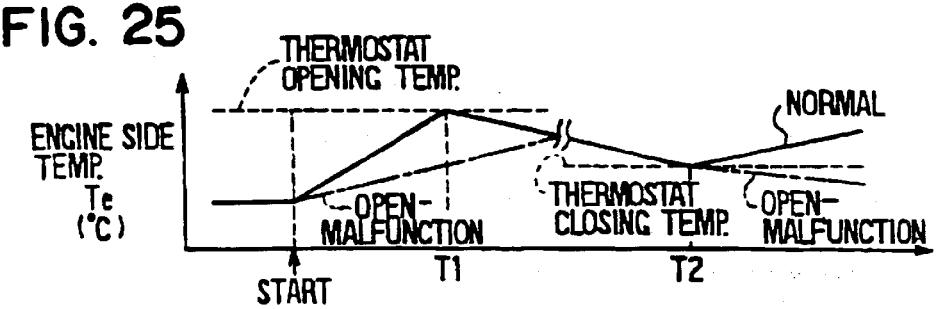
FIG. 25 is a time chart showing the behavior of coolant temperature on the engine side when the open-malfunction during which the thermostat is kept opened occurs as compared to the case when the thermostat operates normally.
Figure 26:
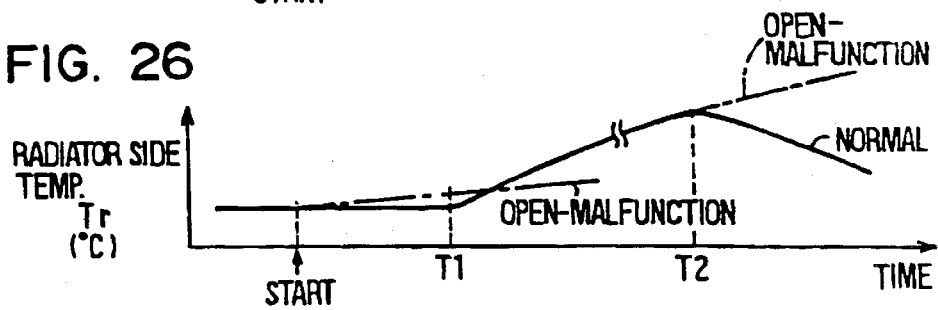
FIG. 26 is a time chart showing the behavior of coolant temperature on the radiator side when the open-malfunction during which the thermostat is kept opened occurs as compared to the case when the thermostat operates normally.

The behavior of the engine side coolant temperature Te and of the radiator side coolant temperature Tr when the open-malfunction has occurred as compared with those in the normal time are shown in FIGS. 25 and 26. Because the thermostat 13 is closed when it is normal at the time of cold start when the engine 11 is started while it is cold, the coolant is stopped from circulating to accelerate the rise of the engine side coolant temperature. Thus, because the radiator side coolant temperature rarely rises, the difference of temperature between the engine side coolant temperature and the radiator side coolant temperature should normally increase as time elapses. When the open-malfunction occurs on the other hand, the cold coolant within the radiator 15 is circulated to the water jacket 12 of the engine 11 from the beginning of the start even at the time of cold start, so that the difference of temperature between the engine side coolant temperature and the radiator side coolant temperature after the start is considerably small as compared with the case of the normal thermostat.

Based on this point, the thermostat 13 is determined whether it is normally closed or has the open-malfunction depending on whether the difference of temperature between the engine side coolant temperature Te and the radiator side coolant temperature Tr at a predetermined period after the cold start is large or not in the open-malfunction diagnosing program shown in FIG. 23. In more detail, it is determined in step 2101 whether it is the cold start or not by determining whether the engine side coolant temperature Te at the time of start is less than the valve closing temperature of the thermostat 13. If it is not the cold start, the program ends without diagnosing the open-malfunction.

The diagnostic of the open-malfunction is implemented at the time of cold start because the engine side coolant temperature Te and the radiator side coolant temperature Tr are almost equal or close to each other and because the increase of the coolant temperature at the time of open-malfunction is largely different from that at the normal time in the period during which the engine side coolant temperature Te reaches the valve opening temperature of the thermostat 13 after the cold start and the open-malfunction may be readily detected as compared with other operating period.

When it is determined to be the cold start in Step 2101, the process advances to Step 2102 to determine whether the open-malfunction diagnosing conditions hold or not. Here, the open-malfunction diagnosing conditions are (a) both the engine side coolant temperature sensor 20 and the radiator side coolant temperature sensor 21 are normal, (b) a predetermined time has elapsed after the cold start (the predetermined time is set within the time T1 during which the engine side coolant temperature Te reaches the valve opening temperature of the thermostat 13 after the cold start), and (c) the engine side coolant temperature Te is lower than the valve opening temperature of the thermostat 13. When all of these conditions (a) through (c) are met, the open-malfunction diagnosing conditions hold.

Here, the condition (a), i.e., whether the both coolant temperature sensors 20 and 21 are normal, is determined whether an output voltage of the coolant temperature sensors 20 and 21 falls within a predetermined range. The condition (b), i.e., whether the predetermined time has elapsed after the cold start, is a temporal condition necessary until when a clear difference appears in the behavior of the coolant temperature during the open-malfunction time and during the normal time. The condition (c), i.e., whether the engine side coolant temperature Te is lower than the valve opening temperature of the thermostat 13, is set because it becomes difficult to discriminate the open-malfunction when the engine side coolant temperature Te exceeds the valve opening temperature of the thermostat 13 and the thermostat 13 is opened.

When conditions (a) through (c) are not met in Step 2102, the open-malfunction diagnosing conditions do not hold and the program ends without implementing the diagnosis of the open-malfunction.

When all the conditions (1) through (3) are met and the open-malfunction diagnosing conditions hold on the other hand, the process advances to Step 2103 to calculate a difference of temperature (Te−Tr) between the engine side coolant temperature Te and the radiator side coolant temperature Tr. Then, an open-malfunction discriminating reference value a for determining the open-malfunction from the difference of temperature (Te−Tr) is calculated from a map or a mathematical expression by parameterizing at least one of an intake air amount GA, an engine speed Ne, an intake air temperature, a vehicle speed and the operating state of the blower motor of the air-conditioner 27 which are parameters influencing the calorific heat value of the engine 11 and the radiation of the coolant.

After that, the difference of temperature (Te−Tr) between the engine side coolant temperature Te and the radiator side coolant temperature Tr is compared with the open-malfunction discriminating reference value α in Step 2105. When the difference of temperature (Te−Tr) is greater than the open-malfunction discriminating reference value a, the process advances to Step 2106 to determine that the thermostat 13 is normally opened as it should be and then to end the program.

When the difference of temperature (Te−Tr) between the engine side coolant temperature Te and the radiator side coolant temperature Tr is smaller than the open-malfunction discriminating reference value $\alpha$ on the other hand, the process advances to Step 2107 to determine that the thermostat 13 has the open-malfunction. The program ends after lighting or flashing the alarm lamp 28 in Step 2108 to warn the driver of that and by storing the information on the open-malfunction in the backup RAM 29.

Figure 27:
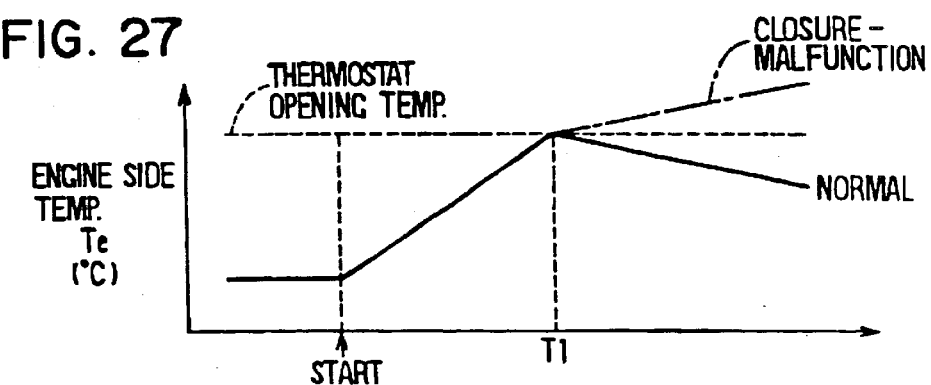
FIG. 27 is a time chart showing the behavior of coolant temperature on the engine side when the closure-malfunction during which the thermostat is kept opened occurs as compared with the case when the thermostat operates normally.
Figure 28:
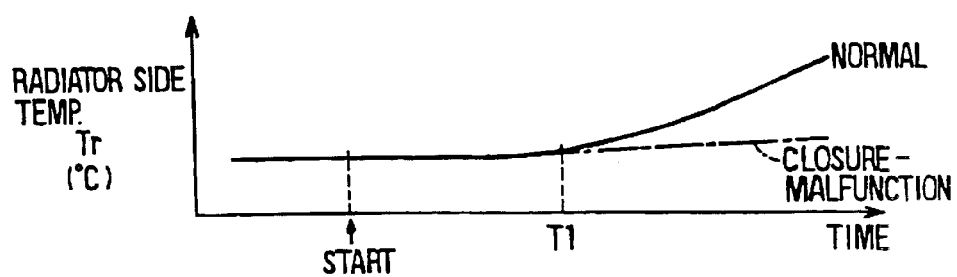
FIG. 28 is a time chart showing the behavior of coolant temperature on the radiator side when the closure-malfunction during which the thermostat is kept opened occurs as compared with the case when the thermostat operates normally.

The closure-malfunction diagnosing program shown in FIG. 24 is based on the behavior of the engine side coolant temperature Te and the radiator side coolant temperature Tr shown in FIGS. 27 and 28 when the closure-malfunction by which the thermostat 13 is kept closed occurs as compared with the case of the normal thermostat. When the engine side coolant temperature exceeds the thermostat valve opening temperature, the valve is opened when the thermostat 13 is normal and the cold coolant on the radiator side circulates to the engine 11, thus dropping the engine side coolant temperature and increasing the radiator side coolant temperature, so that the difference of temperature between the engine side coolant temperature and the radiator side coolant temperature becomes small as time elapses. When the closure-malfunction occurs on the other hand, the thermostat 13 is not opened even when the engine side coolant temperature Te exceeds the thermostat valve opening temperature, no coolant is circulated and the engine side coolant temperature. Te continuously rises up. However, because the radiator side coolant temperature Tr does not rise so much, the difference of temperature between the engine side coolant temperature Te and the radiator side coolant temperature Tr becomes greater as time elapses.

Based on this point, the closure-malfunction diagnosing program shown in FIG. 24 determines the thermostat 13 whether it normally opens or has the closure-malfunction by determining whether the difference of temperature between the engine side coolant temperature Te and the radiator side coolant temperature Tr is large or small within a predetermined period after when the engine side coolant temperature reaches the valve opening temperature of the thermostat 13 at time T1 from the cold start. In more detail, it is determined whether or not the engine side coolant temperature Te at the starting time is less than the valve closing temperature of the thermostat 13 in Step 2201. When it is not the cold start, the program ends without diagnosing the closure-malfunction.

When it is determined to be cold start in Step 2201 on the other hand, the process advances to Step 2202 to determine whether or not closure-malfunction diagnosing conditions hold. Here, the closure-malfunction diagnosing conditions are (a) both the coolant temperature sensor 20 and the radiator side coolant temperature sensor 21 are normal, (b) a predetermined time has elapsed after when the engine side coolant temperature Te has exceeded the valve opening temperature of the thermostat 13 and (c) the engine side coolant temperature Te is higher than the valve closing temperature of the thermostat 13. When all of these conditions (a) through (c) are met, the closure-malfunction diagnosing conditions hold.

Here, the condition (b) (i.e. whether or not the predetermined time has elapsed after exceeding the valve opening temperature of the thermostat 13) is a temporal condition necessary until when a clear difference appears in the behavior of the coolant temperatures Te and Tr during the closure-malfunction time and during the normal time. The condition (c), i.e., whether the engine side coolant temperature Te is higher than the valve closing temperature of the thermostat 13, is set because it becomes difficult to discriminate the closure-malfunction when the engine side coolant temperature Te is less than the valve closing temperature of the thermostat 13 and the thermostat 13 is closed.

When conditions (a) through (c) are not met in Step 2202, the closure-malfunction diagnosing conditions do not hold and the program ends without implementing the diagnosis of the closure-malfunction.

When all the conditions (a) through (c) are met and the closure-malfunction diagnosing conditions hold on the other hand, the process advances to Step 2203 to calculate a difference of temperature (Te−Tr) between the engine side coolant temperature Te and the radiator side coolant temperature Tr. Then, a closure-malfunction discriminating reference value $\beta$ for determining the closure-malfunction from the difference of temperature (Te−Tr) is calculated from a map or a mathematical expression by parameterizing at least one of the intake air amount GA, the engine speed Ne, the intake air temperature, the vehicle speed and the operating state of the blower motor of the air-conditioner 27 which are parameters influencing the calorific heat value of the engine 11 and the radiation of the coolant.

After that, the difference of temperature (Te−Tr) between the engine side coolant temperature Te and the radiator side coolant temperature Tr is compared with the closure-malfunction discriminating reference value $\beta$ in Step 2205. When the difference of temperature (Te−Tr) is less than the closure-malfunction discriminating reference value $\beta$, the process advances to Step 2206: to determine that the thermostat 13 is normally closed as it should be and then to end the program.

When the difference of temperature (Te−Tr) between the engine side coolant temperature Te and the radiator side coolant temperature Tr is larger than the closure-malfunction discriminating reference value $\beta$ on the other hand, the process advances to Step 2207 to determine that the thermostat 13 has the closure-malfunction. The program ends after lighting or flashing the alarm lamp 28 in Step 2208 to warn the driver of that and by storing the information on the closure-malfunction in the backup RAM 29.

According to the second embodiment, the malfunction of the thermostat 13 can be detected based on the engine side coolant temperature Te and the radiator side coolant temperature Tr detected by the engine side coolant temperature sensor 20 and the radiator side coolant temperature sensor 21, so that the aggravation of fuel consumption, the increase of noxious exhaust emission and the overheat caused by the malfunction of the thermostat 13 may be prevented beforehand. Still more, because the coolant temperature sensor for controlling the engine which is provided in the conventional engine may be used as the coolant temperature sensor 20, the system may be relatively simply constructed just by adding the radiator side coolant temperature sensor 21 anew to the conventional engine control system and the increase of the cost is minimized, thus satisfying the demand of reducing the cost.

Further, because the closure-malfunction discriminating reference value is calculated by parameterizing at least one of the intake air amount GA, the engine speed Ne, the intake air temperature, the vehicle speed and the operating state of the blower motor of the air-conditioner 27 which are the parameters influencing the calorific value of the engine 11 and the radiation of the coolant, it becomes possible to determine the malfunction while considering the calorific value of the engine 11 and the radiation of the coolant and thereby the accuracy in diagnosing the malfunction may be enhanced.

(Modifications of Second Embodiment)

Figure 29:
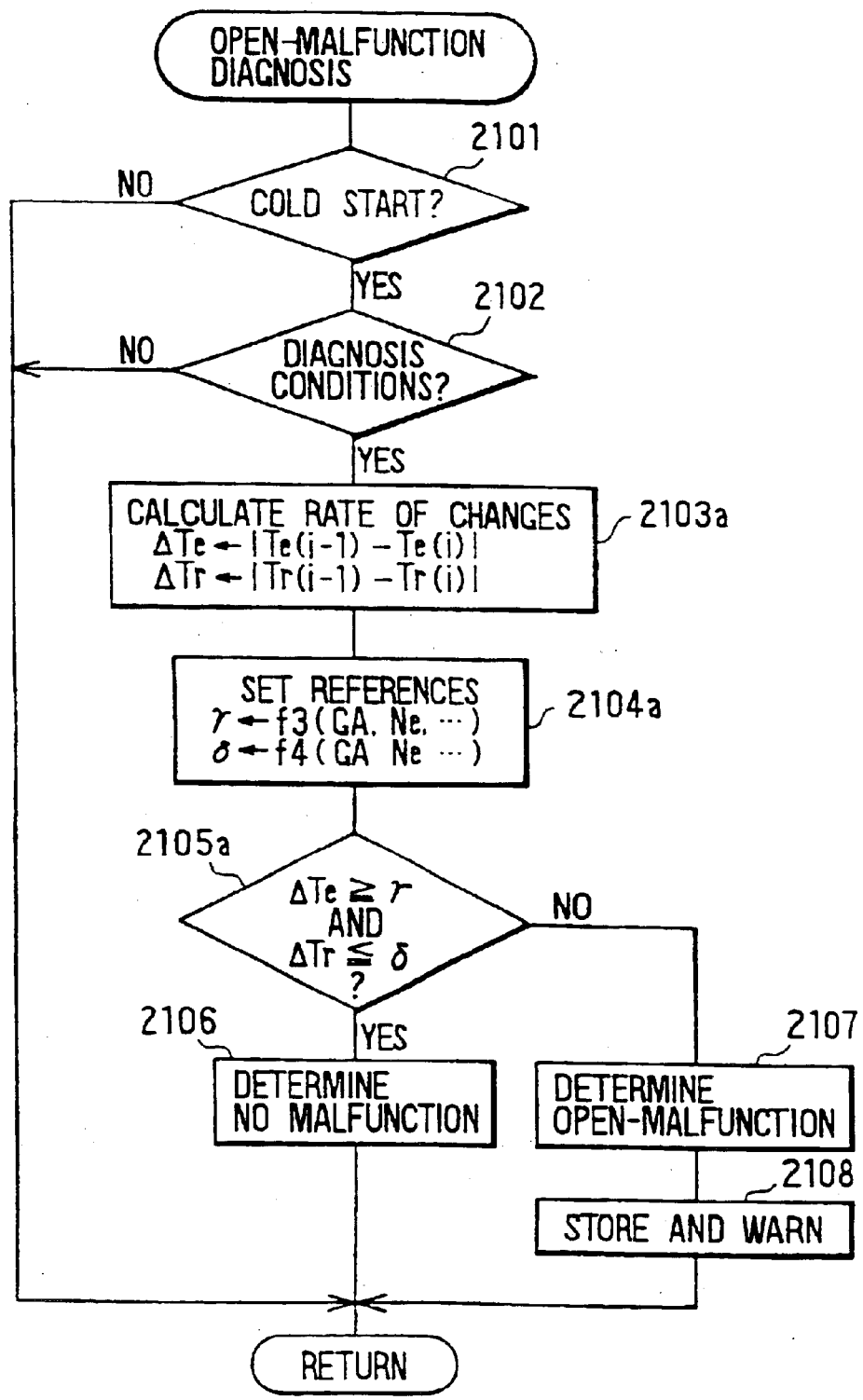
FIG. 29 is a flow chart showing a flow of processing steps of an open-malfunction diagnosing program according to a modification of the second embodiment.
Figure 30:
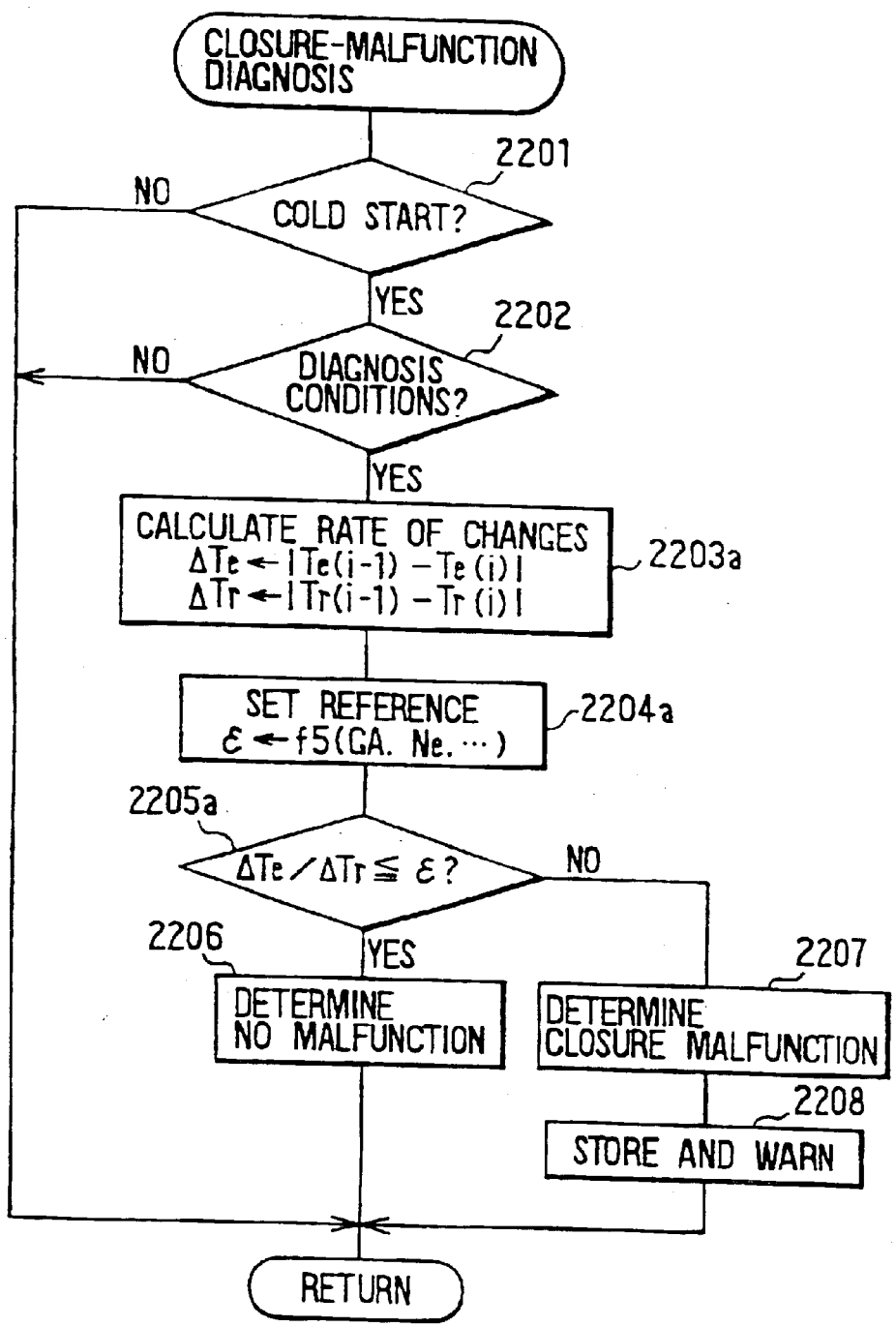
FIG. 30 is a flow chart showing a flow of processing steps of an closure-malfunction diagnosing program according to a modification of the second embodiment.

Alternatively to the second embodiment, the diagnosis whether the thermostat 13 has the open-malfunction/closure-malfunction is implemented based on the rate of change of temperature of the engine side coolant temperature Te and the radiator side coolant temperature Tr in this modification shown in FIGS. 29 and 30.

Similarly to the case shown in FIG. 23, the open-malfunction diagnosing program shown in FIG. 29 executes the processes for diagnosing the open-malfunction on and after Step 2103a when it is the cold start and the open-malfunction diagnosing conditions hold in Steps 2101 and 2102. The open-malfunction diagnosing conditions are the same as those in the second embodiment. In diagnosing the open-malfunction, the rate of change of engine side coolant temperature $\Delta Te$ calculated from an absolute value of the difference between the previous engine side coolant temperature Te(i−1) and the current engine side coolant temperature Te(i) and the rate of change of radiator side coolant temperature $\Delta Tr$ is calculated from the absolute value of the difference between the previous radiator side coolant temperature Tr(i−1) and the current radiator side coolant temperature Tr(i) in Step 2103a.

After that, an open-malfunction discriminating reference value $\gamma$ for determining the open-malfunction from the rate of change of engine side coolant temperature $\Delta Te$ and an open-malfunction discriminating reference value $\delta$ for determining the open-malfunction from the rate of change of radiator side coolant temperature $\Delta Tr$ are calculated from a map or a mathematical expression by parameterizing at least one of the intake air amount GA, the engine speed Ne, the intake air temperature, the vehicle speed and the operating state of the blower motor of the air-conditioner 27 which are the parameters influencing the calorific heat value of the engine 11 and the radiation of the coolant in Step 2104a.

Then, it is determined whether or not the rate of change of engine side coolant temperature $\Delta Te$ is larger than the open-malfunction discriminating reference value $\gamma$ and the rate of change of radiator side coolant temperature $\Delta Tr$ is less than the open-malfunction discriminating reference value $\delta$ in Step 2105a. When the both conditions of $\Delta Te \geq \gamma$ and $\Delta Tr \leq \delta$ are met, the process advances to Step 2106 to determine that the thermostat 13 is normally opened and to end the program.

When even one of the both conditions of $\Delta Te \geq \gamma$ and $\Delta Tr \leq \delta$ are not met on the other hand, the process advances to Step 2107 to determine that the thermostat 13 has the open-malfunction and ends the program after lighting or flashing the alarm lamp 28 to warn the driver of that in Step 2108 and storing the information on the open-malfunction in the backup RAM 29.

Meanwhile, the closure-malfunction diagnosing program shown in FIG. 30 executes, similarly to the case shown in FIG. 24, the processes for diagnosing the closure-malfunction on and after Step 2203a when it is the cold start and the closure-malfunction diagnosing conditions hold in Steps 2201 and 2202. The closure-malfunction diagnosing conditions are the same as those in the second embodiment. In diagnosing the closure-malfunction, the rate of change of engine side coolant temperature $\Delta Te$ is calculated from an absolute value of the difference between the previous engine side coolant temperature Te(i−1) and the engine side coolant temperature Te(i) of this time and the rate of change of radiator side coolant temperature $\Delta Tr$ is calculated from the absolute value of the difference between the previous radiator side coolant temperature Tr(i−1) and the current radiator side coolant temperature Tr(i) in Step 2203a.

After that, a closure-malfunction discriminating reference value $\epsilon$ for determining the closure-malfunction from the rate $\Delta Te/\Delta Tr$ of the rate of change of engine side coolant temperature $\Delta Te$ and the rate of change of radiator side coolant temperature $\Delta Tr$ is calculated from a map or a mathematical expression by parameterizing at least one of the intake air amount GA, the engine speed Ne, the intake air temperature, the vehicle speed and the operating state of the blower motor of the air-conditioner 27 which are the parameters influencing the calorific value of the engine 11 and the radiation of the coolant in Step 2204a.

Then, the rate $\Delta Te/\Delta Tr$ of the rate of change of engine side coolant temperature $\Delta Te$ and the rate of change of radiator side coolant temperature $\Delta Tr$ is compared with the closure-malfunction discriminating reference value $\epsilon$ in Step 2205a. When the $\Delta Te/\Delta Tr \leq \epsilon$, the process advances to Step 2206 to determine that the thermostat 13 is normally opened and to end the program.

When the $\Delta Te/\Delta Tr > \epsilon$ on the other hand, the process advances to Step 2207 to determine that the thermostat 13 has the closure-malfunction and ends the program after lighting or flashing the alarm lamp 28 to warn the driver of that in Step 2208 and storing the information on the closure-malfunction in the backup RAM 29.

While the thermostat 13 has been diagnosed whether it has the open-malfunction after the elapse of the predetermined time from the cold start in the second embodiment and its modification, the open-malfunction may be diagnosed after an elapse of a predetermined time after when the thermostat 13 which has been opened is closed (after T2 in FIGS. 25 and 26). That is, the open-malfunction may be diagnosed in the temperature range in which the thermostat 13 is normally closed.

Further, the intake pipe pressure may be used instead of the intake air amount and the outside-air temperature may be used instead of the intake air temperature as the parameters used in calculating the malfunction discriminating reference value.

Although the cooling fan 18 for cooling the radiator 15 is driven by the power of the engine 11 in the embodiments having the system structure shown in FIG. 21, an electrically driven fan which is driven by an electric motor may be used. Further, the position where the thermostat 13 is mounted is not limited only to the outlet part of the water jacket 12 and may be mounted at other parts such as the inlet part of the water jacket 12.

Still more, because the behavior of the engine side coolant temperature and the radiator side coolant temperature are influenced by the malfunction of the water pump 17, the radiator fan 18 and the blower motor of the air-conditioner 27, it is possible to arrange so as to diagnose the malfunction of the water pump 17, the radiator fan 18 and the blower motor of the air-conditioner 27 from the engine side coolant temperature and the radiator side coolant temperature.

Further, the output signal of the radiator side coolant temperature sensor 21 may be used as information for controlling the engine when the coolant temperature sensor 20 is out of order. The second embodiment and its modifications may be arranged so as to implement only either one of the open-malfunction diagnosing program or the closure-malfunction diagnosing program.

(Third Embodiment)

Figure 31:
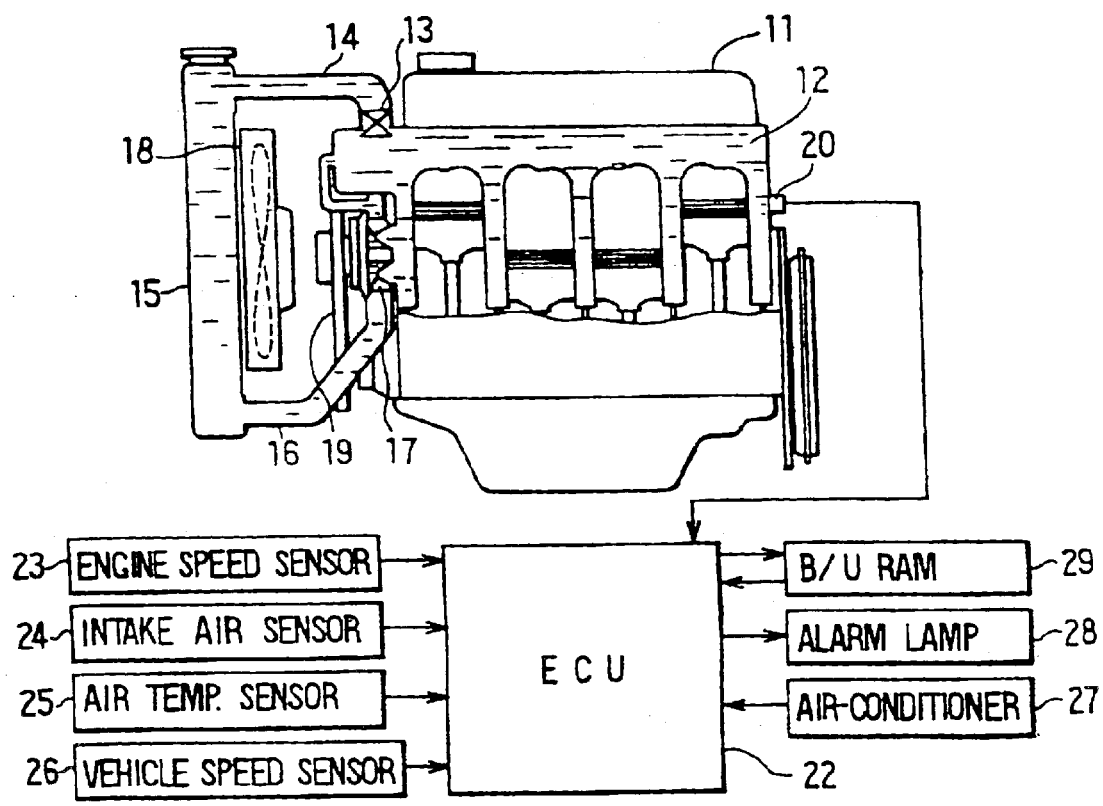
FIG. 31 is a block diagram showing the structure of the whole engine cooling system according to a third embodiment of the present invention.

The whole cooling system of the engine 11 of the this embodiment shown in FIG. 31 is the same as that of the first embodiment in which only one coolant temperature sensor 20 is provided at the engine side. The ECU 22 diagnoses the thermostat 13 whether it has the open-malfunction by executing each diagnosis routine shown in FIGS. 32 and 33 after engine warm-up completion even under normal engine running condition which follows idling.

Figure 34:
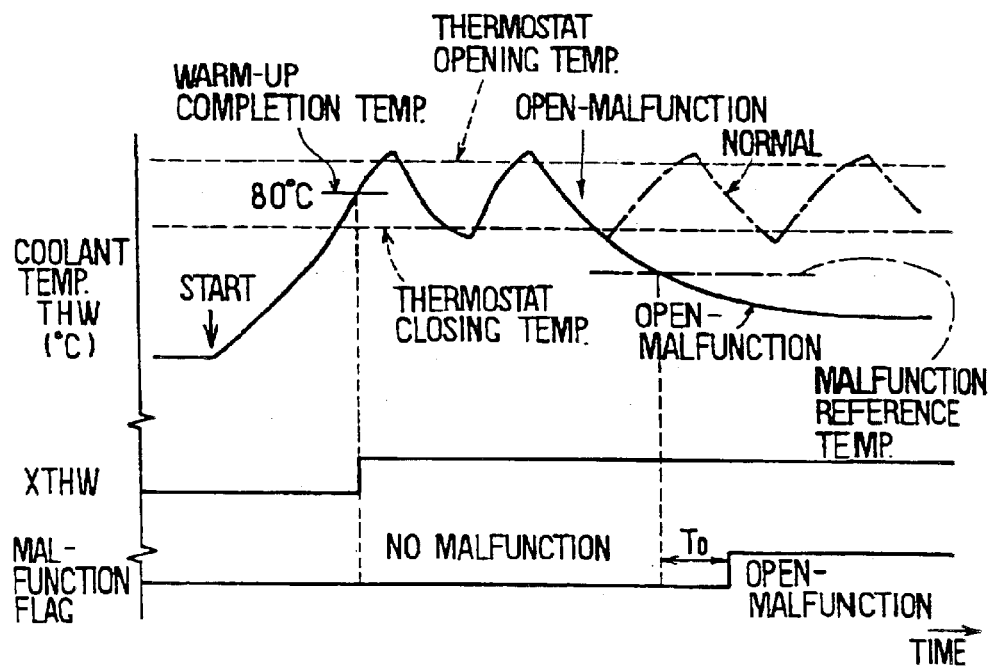
FIG. 34 is a time chart shoring a behavior of operation for diagnosing the open-malfunction of the thermostat.

In FIG. 34, when the coolant temperature THW detected by the engine side coolant temperature sensor 20 exceeds the thermostat opening temperature, the thermostat 13 opens when it is normal, so that the cold coolant on the radiator 15 side flows into the engine 11 side to suppress the coolant temperature from rising. Then, the coolant temperature drops below the thermostat opening temperature. When the coolant temperature THW drops below the thermostat closing temperature after that, the thermostat 13 is closed and the coolant is stopped from circulating from the radiator 15 side to the engine 11 side. Then, the coolant on the engine 11 side is warmed up by the heat of the engine 11 and the coolant temperature THW rises up more than the thermostat closing temperature. Accordingly, the state in which the coolant temperature THW drops largely below the thermostat closing temperature does not continue for a long period of time.

Based on this point, the thermostat 13 is determined to have the open-malfunction when the state in which the coolant temperature THW drops below the malfunction discriminating temperature (e.g. 70° C.) which is lower than the thermostat closing temperature continues for a predetermined time since when the coolant temperature THW has exceeded the warm-up completion temperature. (e.g. 80° C.) after the start of the engine in the this embodiment.

Figure 32:
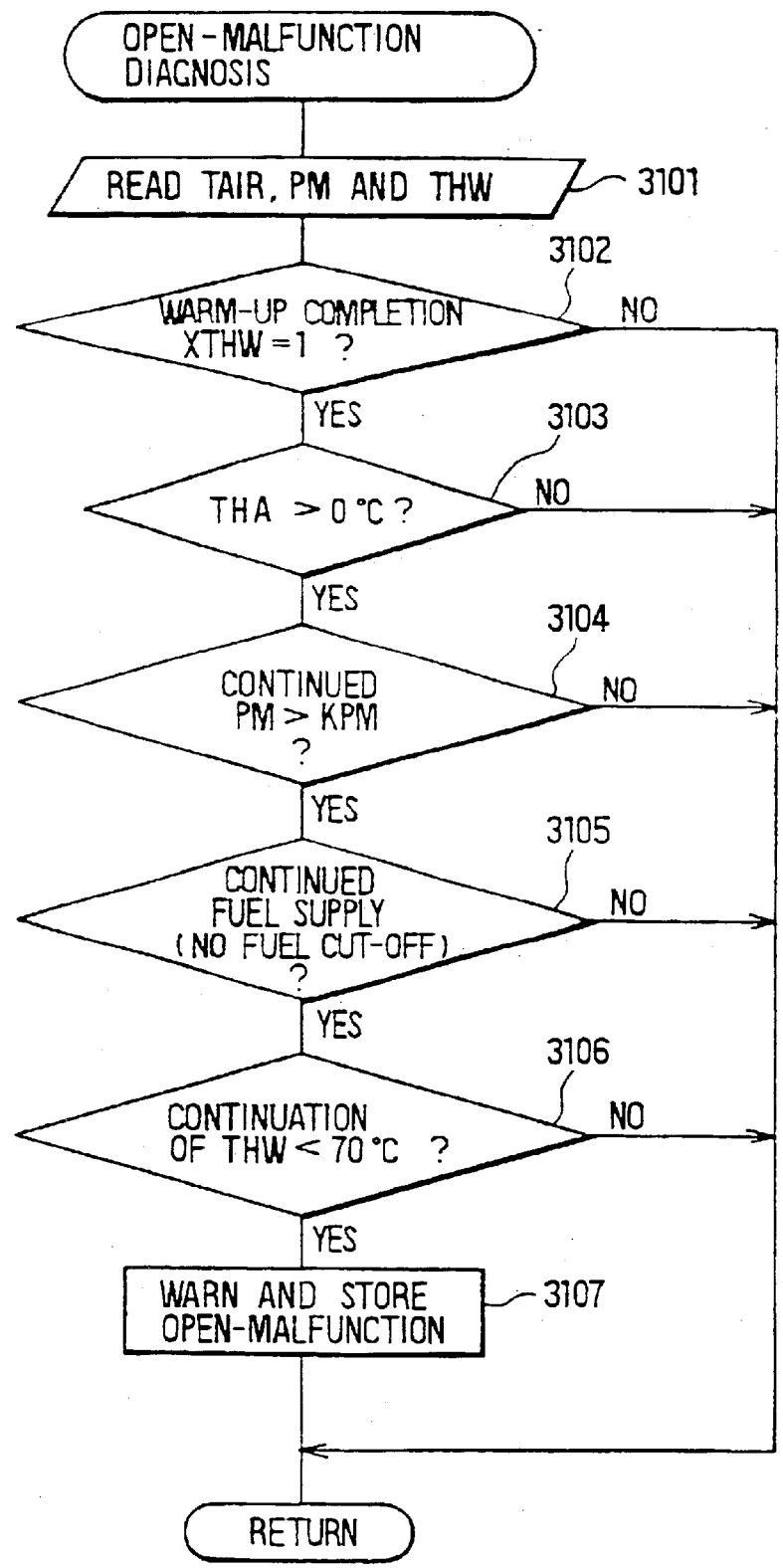
FIG. 32 is a flow chart showing a flow of processing steps of a routine for diagnosing an open-malfunction of a thermostat.
Figure 33:
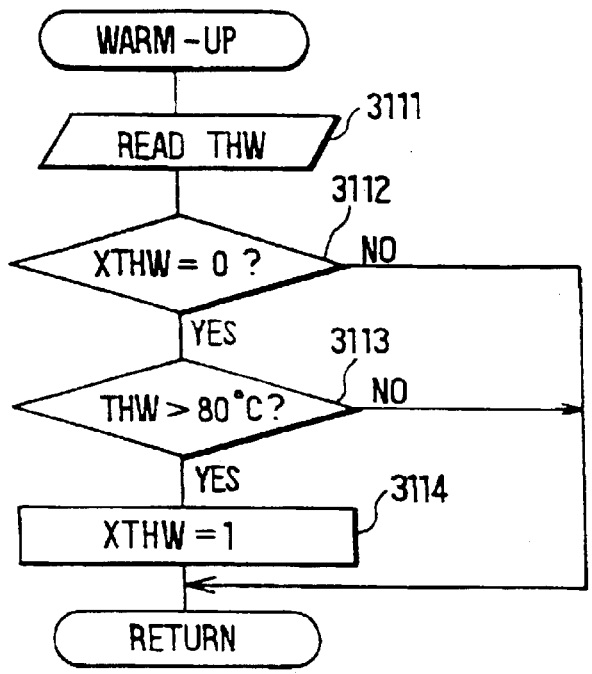
FIG. 33 is a flow chart showing a flow of processing steps of a routine for setting a warm-up completion flag.

The thermostat open-malfunction diagnosing routine shown in FIG. 32 is initiated per predetermined time (e.g. 32 ms). When this program is initiated, data of the intake air temperature THA, the intake pipe pressure PM and the coolant temperature THW output respectively from an intake air temperature sensor 25, an intake pipe pressure sensor 24 and the coolant temperature sensor 20 in Step 3101. Then, it is determined whether the following malfunction diagnosing conditions (d) through (g) hold in Steps 3102 through 3105:

(d) A warm-up completion flag XTHW which is set in the routine in FIG. 33 is "1" indicating that the warm-up has been completed. That is, the coolant temperature THW has risen up more than 80° C. for example which is the warm-up completion temperature (Step 3102);

(e) The intake air temperature THA is higher than 0° C. (Step 3103);

(f) The state in which the intake pipe pressure PM is larger than a predetermined value KPM (i.e. non-low load state) is continuing for more than the predetermined time (Step 3104); and (g) Fuel is supplied continuously, that is, fuel cut-off is not continuing for more than the predetermined time (Step 3105).

When all of these conditions (d) through (g) are satisfied (when the determinations of Steps 3102 through 3105 are all "Yes") indicating that the engine 11 is in other than the idling or deceleration, the malfunction diagnosing conditions hold. When there is even one condition which is not satisfied, the malfunction diagnosing conditions do not hold and the this routine ends without implementing the diagnosis of malfunction.

Here, the conditions (e) through (g) (Steps 3103 through 3105) are what for determining whether it is the operating state during which the coolant temperature THW is inclined to drop. When any one of Steps 3103 through 3105 is "No", i.e., the intake air temperature is THA≦0° C., the low load state (PM<KPM) is continuing for more than the predetermined time, or the fuel cut-off is continuing for more than the predetermined time, it is the operating state during which the coolant temperature THW inclines to drop. When the operating state during which the coolant temperature THW inclines to drop continues, the coolant temperature THW may drop continuously and moderately even if the thermostat 13 is closed, so that the discrimination of the malfunction is inhibited by the processes in Steps 3103 through 3105 to prevent an erroneous discrimination of the open-malfunction of the thermostat 13 in advance.

When this malfunction diagnosing conditions hold, i.e. the warm-up completion flag XTHW=1 (warm-up is completed) and it is not the operating state during which the coolant temperature THW inclines to drop (when all "Yes" in Steps 3102 through 3105), the process advances to Step 3106 to determine whether or not the state in which the coolant temperature THW drops below the malfunction discriminating temperature (e.g. 70° C.) which is lower than the thermostat closing temperature for more than the predetermined time To. When it is "Yes", the process advances to Step 3107 to determine that the thermostat 13 has the open-malfunction and ends the routine after lighting or flashing the alarm lamp 28 to warn the driver of that and storing the malfunction information in the backup RAM 29. When the state during which the THW<70° C. (malfunction discriminating temperature reference value) is not continuing for more than the predetermined time To on the other hand, it is not determined to be the open-malfunction and the routine ends.

It is noted that although it has been determined whether or not the thermostat 13 has the open-malfunction by determining whether the state during which the coolant temperature THW<70° C., the thermostat 13 may be determined to have the open-malfunction when the coolant temperature TRW drops below the malfunction discriminating temperature. Thereby, the thermostat 13 may be determined whether it has the open-malfunction or not by setting the malfunction discriminating temperature at a temperature fully lower than the thermostat closing temperature.

The warm-up completion flag setting routine shown in FIG. 33 is initiated per predetermined time (e.g. 32 ms) and reads the coolant temperature TRW detected by the coolant temperature sensor 20 at first in Step 3111. Then, it is determined whether the warm-up completion flag XTHW is "o" indicating that the warm-up has not been completed in Step 3112. When it has been set as XTHW=1 (warm-up is completed), the routine ends as it is.

When XTHW=0 (warm-up is not completed), the process advances to Step 3113 to determine whether the coolant temperature THW has exceeded 80° C., for example, which is the warm-up completion temperature. When it has not exceeded 80° C., the routine ends as it is. When it has exceeded 80° C., i.e. when the warm-up has been completed, the process advances to Step 3114 to set the warm-up completion flag XTHW to "1" meaning that the warm-up has been completed and ends the routine. It is noted that the warm-up completion flag XTHW is reset to "0" by the initialization process at the starting time of the engine.

Because the open-malfunction of the thermostat 13 may be detected from the coolant temperature THW detected by the coolant temperature sensor 20 in the third embodiment described above, no new sensor or the like for detecting the open-malfunction is necessary, satisfying the demand of reducing the cost.

It is noted that it is possible to add a function of determining the closure-malfunction of the thermostat 13 or the malfunction of the radiator fan 18 when the coolant temperature THW rises more than a predetermined temperature higher than the thermostat opening temperature or when that state continues for the predetermined time. Further, the outside air temperature may be used instead of the intake air temperature in Step 3103.

(Modification of Third Embodiment)

A modification in which the third embodiment is applied to a vehicle provided with an electronic throttle system will be explained below based on FIGS. 35 through 40. As described before, when the thermostat 13 operates normally, the coolant temperature THW is controlled almost within the temperature range from the thermostat closing temperature to the thermostat opening temperature (required coolant temperature range) and the state in which the coolant temperature THW is out of the required coolant temperature range will not continue for a long time in the normal operating state.

Figure 39:
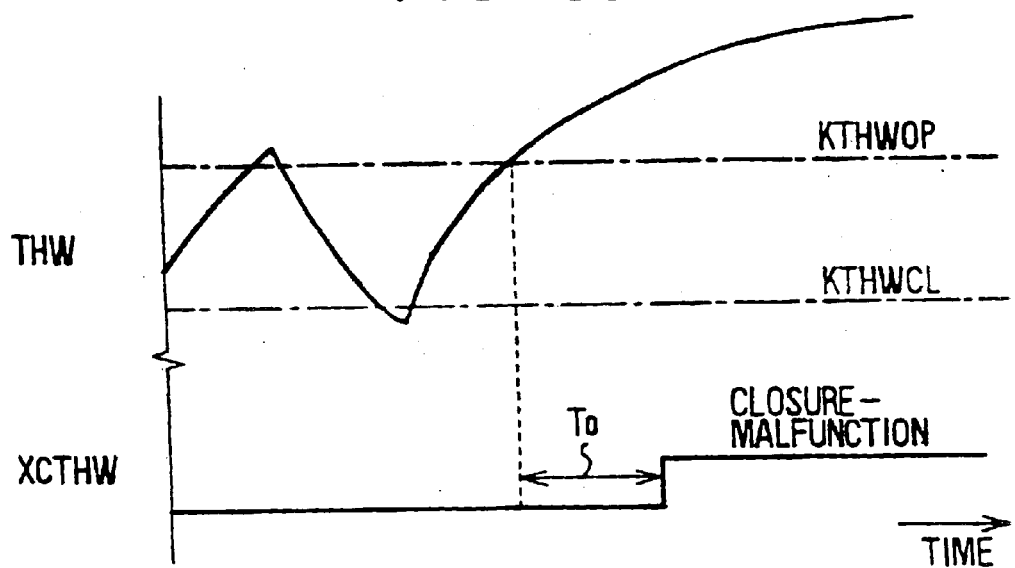
FIG. 39 is a time chart showing a behavior when the closure-malfunction occurs.
Figure 40:
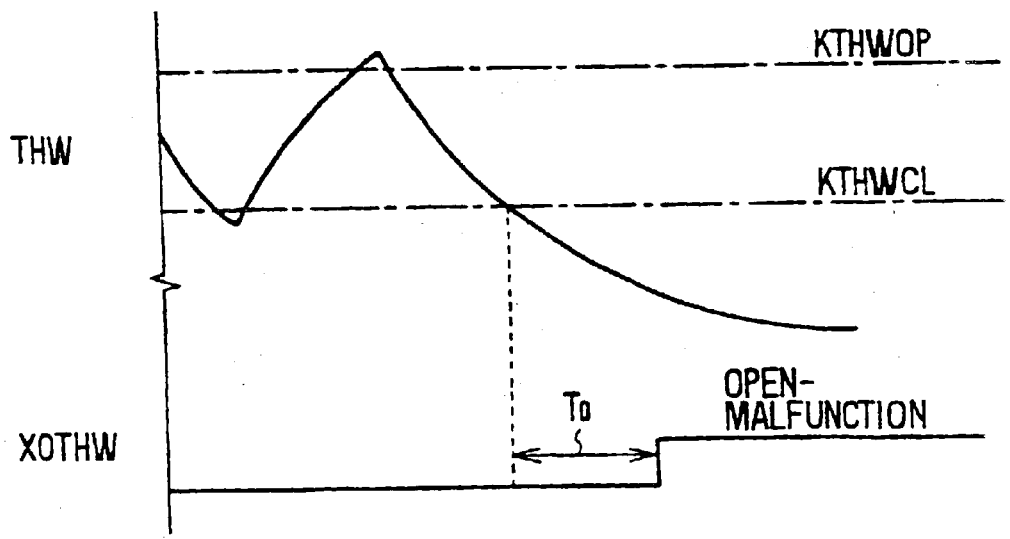
FIG. 40 is a time chart showing a behavior when the open-malfunction occurs.

Based on this point, it is determined that the thermostat 13 has the closure-malfunction in which it is kept closed when the coolant temperature THW continuously rises up even when the predetermined time To has elapsed since when the coolant temperature THW has risen more than the thermostat opening temperature as shown in FIG. 39 in this modification. Further, it is determined that the thermostat 13 has the open-malfunction in which it is kept opened when the coolant temperature THW continuously drops even when the predetermined time To has elapsed since when the coolant temperature THW has dropped below the thermostat closing temperature.

Figure 35:
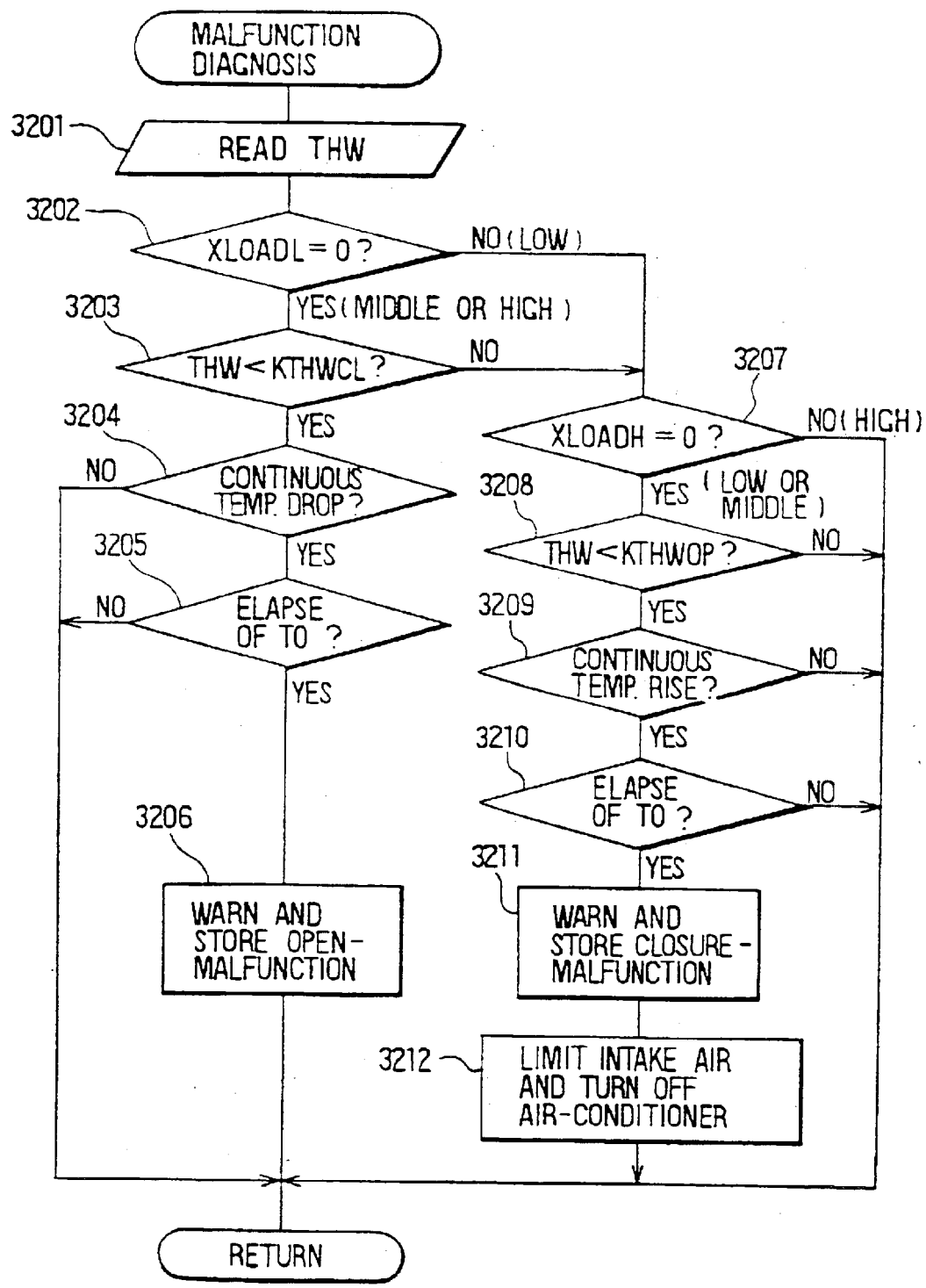
FIG. 35 is a flow chart showing a flow of processing steps of a routine for diagnosing a malfunction of the thermostat according to a modification of the third embodiment.
Figure 36:
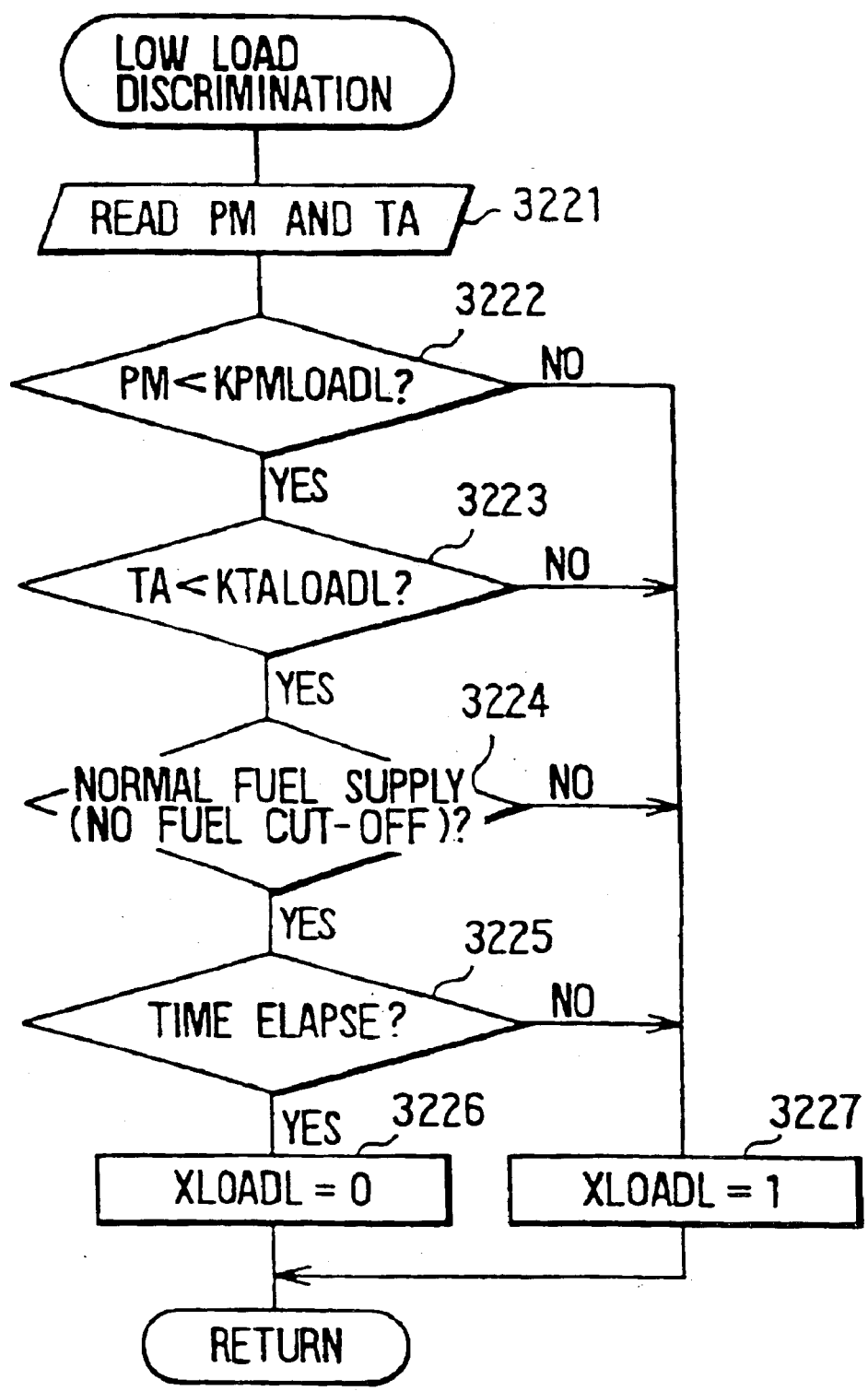
FIG. 36 is a flow chart showing a flow of processing steps of a low load determining routine.

This modified diagnosis routine is shown in FIGS. 35 through 38. The thermostat malfunction diagnosing routine shown in FIG. 35 is initiated per predetermined time (e.g. 32 ms). When this program is initiated, the coolant temperature TRW detected by the coolant temperature sensor 20 is read in Step 3201. Then, it is determined in Step 3202 whether or not a low load flag XLOADL set/reset by the routine in FIG. 36 is "0", i.e. a middle load or high load range.

When XLOADL=0 (the middle load or high load range), it is determined in Steps 3203 through 3206 whether the thermostat 13 has the open-malfunction or not. At first, it is determined whether or not the coolant temperature THW is lower than the thermostat closing temperature KTHWCL in Step 3203. When it is "Yes", the process advances to Step 3204 to determine whether or not the coolant temperature THW continuously drops. When it is "Yes", it is determined whether or not the predetermined time To during which the coolant temperature THW continuously drops has elapsed.

When the predetermined time To during which the coolant temperature THW continuously drops has elapsed, the process advances to Step 3206 to determine that the thermostat 13 has the open-malfunction. Then, the routine ends after lighting or flashing the alarm lamp 28 to warn the driver of that and storing the malfunction information in the backup RAM 29.

When it is determined to be "No" either in Step 3204 or 3205, i.e. the time during which the coolant temperature THW continuously drops has not reached the predetermined time, on the other hand, it is not determined to be the open-malfunction and the routine ends.

Figure 37:
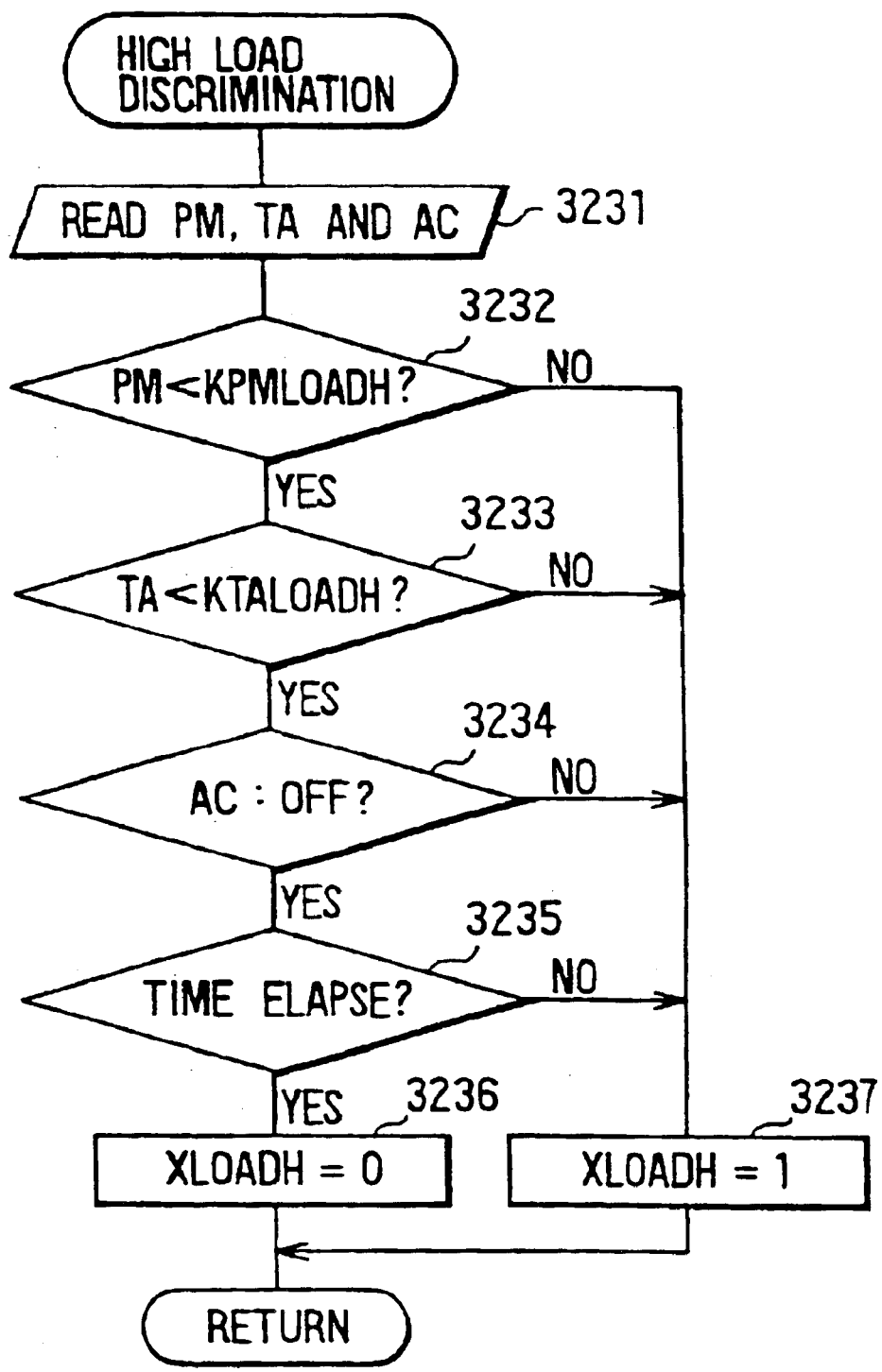
FIG. 37 is a flow chart showing a flow of processing steps of a high load determining routine.

When it is determined to be "No" either in Step 3202 or 3203, i.e. XLOADL=1 (low load range) or the coolant temperature THW is more than the thermostat closing temperature KTHWCL, the process advances to Step 3207 to determine whether or not a high load flag XLOADH set/ reset in the routine in FIG. 37 is "0", i.e., the low load or middle load range.

When XLOADH=0 (the low load or middle load range), it is determined in Steps 3208 through 3211 whether the thermostat 13 has the closure-malfunction or not. At first, it is determined whether or not the coolant temperature THW is higher than the thermostat opening temperature KTHWOP in Step 3208. When it is "Yes", the process advances to Step 3209 to determine whether or not the coolant temperature THW continuously rises. When it is "Yes", it is determined whether or not the predetermined time during which the coolant temperature THW continuously rises has elapsed.

When the predetermined time To during which the coolant temperature THW continuously rises has elapsed, the process advances to Step 3211 to determine that the thermostat 13 has the closure-malfunction. Then, the routine ends after lighting or flashing the alarm lamp 28 to warn the driver of that and storing the malfunction information in the backup RAM 29 and by limiting the throttle opening by a target throttle opening computing routine shown in FIG. 38 to limit the intake air amount to limit the output of the engine (calorific heat value of the engine) and to limit ON of the air-conditioner 27 (drive of the compressor) to limit the engine load in Step 3212.

Thus, switching to the control mode by which the intake air amount is limited and ON time of the air-conditioner is limited reduces the load of the engine, prevent the engine from overheating and enables limp-home running to a service station. It is noted that it is possible to arrange so as to implement only either one of the limit of the intake air amount and the limit of ON of the air-conditioner.

When it is determined to be "No" in either one of Steps 3208 through 3210, i.e., the coolant temperature THW is below the thermostat opening temperature KTHWOP, or the time during which the coolant temperature THW continuously rises up does not reach the predetermined time To, it is not determined to be the closure-malfunction and the routine ends.

The process in Step 3202 thus inhibits the discrimination of the open-malfunction during the low load range and the process in Step 3207 inhibits the discrimination of the closure-malfunction during the high load range. That is, because there is a case when the coolant temperature THW continuously and moderately drops even when the thermostat 13 is closed in the low load range, an erroneous discrimination of the open-malfunction may be prevented by inhibiting the discrimination of the open-malfunction. Further, because there is a case when the coolant temperature THW continuously and moderately rises even when the thermostat 13 is opened in the high load range, an erroneous discrimination of the closure-malfunction may be prevented by inhibiting the discrimination of the closure-malfunction.

It is noted that although both the open-malfunction and the closure-malfunction have been detected in the thermostat malfunction diagnosing routine in FIG. 35, it is possible to arrange so as to detect only either one of the closure-malfunction and the open-malfunction.

The low load discriminating routine for Step 3202 in FIG. 35 is shown in FIG. 36 and is initiated per predetermined time (e.g., per 8 ms). When this routine is initiated, the intake pipe pressure PM and the throttle opening TA are read in Step 3221 at first. Then, it is determined whether or not the present operating range is the low load range as follows in Steps 3222 through 3225. Here, the low load range is the operating range in which the coolant temperature THW may continuously drops even when the coolant temperature THW drops below the thermostat closing temperature KTHWCL and the thermostat 13 is closed when the thermostat 13 operates normally.

At first, the intake pipe pressure PM is compared with a low load discriminating value KPMLOADL in Step 3222. When the intake pipe pressure PM is less than the low load discriminating value KPMLOADL, it is determined to be the low load range and the process advances to Step 3227 to set the low load flag XLOADL to "1". The low load discriminating value KPMLOADL is set in correspondence with an engine speed at that moment by using a table or a mathematical expression of the KPMLOADL set by parameterizing the engine speed in advance.

When it is determined that the intake-pipe pressure PM is greater than the low load discriminating value KPMLOADL, the process advances to Step 3223 to compare the throttle opening TA with the low load discriminating value KPMLOADL. When the throttle opening TA is less than the low load discriminating value KPMLOADL, it is determined to be the low load range and the process advances to Step 3227 to set the low load flag XLOADL to "1". The low load discriminating value KPMLOADL is also set in correspondence with the engine speed at that moment by using the table or the mathematical expression in advance.

When it is determined in Step 3223 that the throttle opening TA is greater than the low load discriminating value KPMLOADL, the process advances to Step 3224 to determine whether fuel is supplied normally or cut off for deceleration. When the fuel is being cut off, it is determined to be the low load range and the process advances to Step 3227 to set the low load flag XLOADL to "1".

When the fuel is supplied normally without fuel cut-off, the process advances to Step 3225 to determine whether the predetermined time during which the three conditions of PM>PLMLOADL at Step 3222, TA>KTALOADL at Step 3223 and normal fuel supply at Step 3224 are all satisfied has elapsed. When the predetermined time has not elapsed, it is determined to be the low load range and the process advances to Step 3227 to set the low load flag XLOADL to "1" and to end the routine.

When it is determined to be "Yes" in all of Steps 3222 through 3225 on the other hand, i.e. the predetermined time during which all the conditions are satisfied has elapsed, it is determined to be the middle load or the high load range. Then, the process advances to Step 3226 to set the low load flag XLOADL to "0" and to end the routine.

The high load discriminating routine for Step 3207 shown in FIG. 35 is shown in FIG. 37 and is initiated per predetermined time (e.g., per 8 ms). When this routine is initiated, the intake pipe pressure PM, the throttle opening TA and an air-conditioner signal AC are read in Step 3231 at first. Then, it is determined whether or not the present operating range is the high load range as follows in Steps 3232 through 3235. Here, the high load range is the operating range in which the coolant temperature THW may continuously rise even when the coolant temperature THW rises above the thermostat opening temperature KTHWOP and the thermostat 13 is opened when the thermostat 13 operates normally.

At first, the intake pipe pressure PM is compared with the high load discriminating value KPMLOADH in Step 3232. When the intake pipe pressure PM is more than the high load discriminating value KPMLOADH, it is determined to be the high load range and the process advances to Step 3237 to set the high load flag XLOADH to "1". The high load discriminating value KPMLOADL is set in correspondence to an engine speed at that moment by using a table or a mathematical expression of the KPMLOADH set by parameterizing the engine speed in advance.

When it is determined that the intake-pipe pressure PM is smaller than the high load discriminating value KPMLOADH in Step 3232, the process advances to Step 3233 to compare the throttle opening TA with the high load discriminating value KPMLOADH. When the throttle opening TA is greater than the high load discriminating value KPMLOADH, it is determined to be the high load range and the process advances to Step 3237 to set the high load flag XLOADH to "1". The high load discriminating value KPMLOADH described above is also set in correspondence with the engine speed at that moment by using the table or the mathematical expression in advance.

When it is determined in Step 3233 that the throttle opening TA is smaller than the high load discriminating value KPMLOADH, the process advances to Step 3234 to determine whether or not the air-conditioner signal AC is OFF. When it is not OFF (i.e., ON), it is determined to be the high load range and the process advances to Step 3237 to set the high load flag XLOADH to "1".

When the air-conditioner signal AC is OFF, the process advances to Step 3235 to determine whether the predetermined time during which the three conditions of PM<PLMLOADH at Step 3232, TA<KTALOADL at Step 3233 and the air-conditioner signal AC is OFF at Step 3234 are all satisfied has elapsed. When the predetermined time has not elapsed yet, it is determined to be the high load range and the process advances to Step 3237 to set the high load flag XLOADH to "1" and to end the routine.

When it is determined to be "Yes" in all of Steps 3232 through 3235 on the other hand, i.e., the predetermined time during which all those conditions are satisfied has elapsed, it is determined to be the low load or the middle load range. Then, the process advances to Step 3236 to reset the high load flag XLOADH to "0" and to end the routine.

Figure 38:
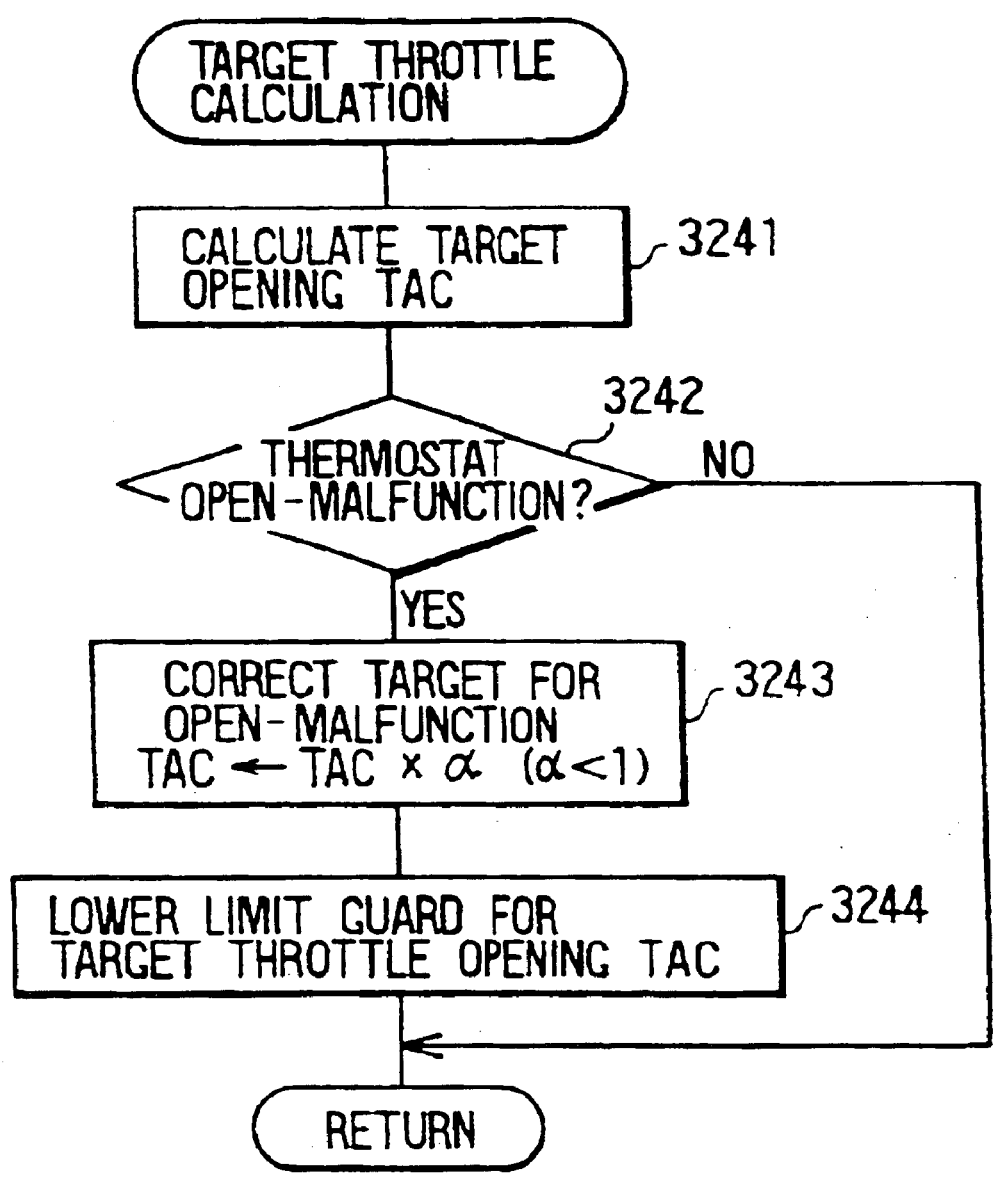
FIG. 38 is a flow chart showing a flow of processing steps of a target throttle opening computing routine.

The target throttle opening computing routine shown in FIG. 38 is initiated per predetermined time (e.g., per 2 ms) and computes a target throttle opening TAC in correspondence with the control of an accelerator pedal (not shown). The detail of the method for computing the target throttle opening TAC is known in the art. After computing the target throttle opening TAC, it is determined in Step 3242 whether the thermostat 13 has the open-malfunction or not based on the result of the diagnosis of the malfunction by the routine shown in FIG. 35. When it is not the open-malfunction, the routine ends as it is. In this case, the aperture of the throttle valve is controlled in response to the target throttle opening TAC computed in Step 3241.

When the open-malfunction has occurred on the other hand, the process advances from Step 3242 to Step 3243 to correct the target throttle opening TAC by multiplying a correction factor α to the target throttle opening TAC calculated in Step 3241. Here, the target throttle opening TAC at the time of open-malfunction is reduced as compared with that during the normal time by setting the correction factor α<0 to limit the intake air amount. It is noted that a map for calculating the target throttle opening TAC during the open-malfunction may be prepared and stored in the ROM in advance to calculate the target throttle opening TAC during the open-malfunction from this map.

Then, a lower limit guarding process is implemented so that the target throttle opening TAC during the open-malfunction will not become too small in Step 3224 and then the routine ends.

It is noted that it is possible to arrange so as to limit the intake air amount and to limit ON time of the air-conditioner (switching to the control mode during a malfunction) when a malfunction other than that of the thermostat 13 (such as a malfunction of the radiator fan 18, the drop of coolant level and the like) occurs in the engine cooling system.

Further, each routine shown in FIGS. 35 through 37 may be applied to a vehicle not provided with the electronic throttle. In this case, ON/OFF of the air-conditioner is implemented in Step 3212 in FIG. 35.

While preferred embodiments and modifications thereof have been described, further variations thereto will occur to those skilled in the art within the scope of the present inventive concepts which are delineated by the following claims.

What is claimed is:

1. A method for detecting a malfunction of an internal combustion engine thermostat provided in a coolant circulating path, said method comprising:

detecting a first temperature of coolant on the coolant circulating path on the engine side of the thermostat at a location spaced from the thermostat;

determining whether the first temperature is less than an opening temperature of the thermostat;

detecting an intake air amount;

calculating a value based on the intake amount;

detecting, after the first temperature is detected, a second engine side coolant temperature at the location spaced from the thermostat during a period in which the thermostat is normally to be closed; and detecting an open-malfunction of the thermostat based on the calculated value and the second engine side coolant temperature in case the first temperature is determined to be lower than the opening temperature.

2. A method as in claim 1, wherein said detecting an open-malfunction determines whether the second engine side coolant temperature fails to reach a reference temperature before the calculated value reaches a reference value, for detecting the open-malfunction of the thermostat.

3. A method as in claim 1, wherein said detecting an open-malfunction determines whether the calculated value reaches a reference value before the second engine side coolant temperature reaches a reference temperature.

* * * * *